(12) United States Patent
Yeh et al.

(10) Patent No.: US 11,467,376 B2
(45) Date of Patent: Oct. 11, 2022

(54) IMAGE CAPTURING OPTICAL LENS ASSEMBLY, IMAGING APPARATUS AND ELECTRONIC DEVICE

(71) Applicant: LARGAN PRECISION CO., LTD., Taichung (TW)

(72) Inventors: Kuan-Ting Yeh, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 188 days.

(21) Appl. No.: 17/111,573

(22) Filed: Dec. 4, 2020

(65) Prior Publication Data
US 2021/0349287 A1    Nov. 11, 2021

(30) Foreign Application Priority Data

May 5, 2020   (TW) .................................. 109114928

(51) Int. Cl.
*G02B 13/00* (2006.01)
*G02B 9/16* (2006.01)
*H04M 1/02* (2006.01)

(52) U.S. Cl.
CPC ........... *G02B 13/0035* (2013.01); *G02B 9/16* (2013.01); *G02B 13/0065* (2013.01); *H04M 1/0264* (2013.01)

(58) Field of Classification Search
CPC ... G02B 13/0065; G02B 9/16; G02B 13/0035
USPC .................................................. 359/708, 716
See application file for complete search history.

(56) References Cited

U.S. PATENT DOCUMENTS

| | | |
|---|---|---|
| 1,028,281 A | 6/1912 | Rohr et al. |
| 1,293,086 A | 2/1919 | Graf et al. |
| 1,616,751 A | 2/1927 | Albert et al. |
| 2,063,178 A | 12/1936 | Willy et al. |
| 2,158,507 A | 5/1939 | Albert et al. |
| 2,324,057 A | 7/1943 | Bennett et al. |
| 2,371,165 A | 3/1945 | Glancy |
| 2,474,837 A | 7/1949 | Estelle et al. |
| 2,520,633 A | 8/1950 | Grey et al. |
| 2,571,307 A | 10/1951 | Taylor et al. |
| 2,728,266 A | 12/1955 | Karl et al. |

(Continued)

FOREIGN PATENT DOCUMENTS

| | | |
|---|---|---|
| CN | 110554479 A | 12/2019 |
| CN | 110989142 A | 4/2020 |

(Continued)

*Primary Examiner* — James R Greece
(74) *Attorney, Agent, or Firm* — McClure, Qualey & Rodack, LLP

(57) ABSTRACT

An image capturing optical lens assembly includes three lens elements, the three lens elements being, in order from an object side to an image side along an optical path, a first lens element, a second lens element and a third lens element. Each of the three lens elements has an object-side surface towards the object side and an image-side surface towards the image side. The second lens element has negative refractive power. The object-side surface of the third lens element is concave in a paraxial region thereof, and the image-side surface of the third lens element is convex in a paraxial region thereof. The image capturing optical lens assembly has a total of three lens elements.

29 Claims, 31 Drawing Sheets

(56) References Cited

U.S. PATENT DOCUMENTS

| | | | |
|---|---|---|---|
| 2,854,891 A | 10/1958 | Schade et al. | |
| 3,062,100 A | 11/1962 | Maximilian et al. | |
| 3,115,537 A | 12/1963 | Bird et al. | |
| 3,180,217 A | 4/1965 | Argyle et al. | |
| 3,249,009 A | 5/1966 | Jakob et al. | |
| 3,252,373 A | 5/1966 | Martin et al. | |
| 3,273,456 A | 9/1966 | William et al. | |
| 3,536,379 A | 10/1970 | Knetsch et al. | |
| 4,103,989 A | 8/1978 | Rosin | |
| 4,109,995 A * | 8/1978 | Betensky | G02B 9/16 359/716 |
| 4,999,005 A | 3/1991 | Cooper | |
| 5,033,831 A | 7/1991 | Sigler | |
| 5,087,988 A * | 2/1992 | Nakayama | G02B 15/143103 359/740 |
| 5,175,652 A | 12/1992 | Shimizu | |
| 5,270,861 A | 12/1993 | Estelle | |
| 5,270,867 A | 12/1993 | Estelle | |
| 5,345,337 A | 9/1994 | Sigler | |
| 5,381,269 A | 1/1995 | Estelle | |
| 5,517,366 A | 5/1996 | Togino | |
| 5,654,828 A | 8/1997 | Togino et al. | |
| 5,659,430 A | 8/1997 | Togino | |
| 5,694,251 A | 12/1997 | Shimada et al. | |
| 5,801,885 A | 9/1998 | Togino | |
| 5,805,356 A | 9/1998 | Chiba | |
| 5,815,324 A | 9/1998 | Yamamoto | |
| 5,886,826 A | 3/1999 | Amemiya | |
| 5,991,096 A | 11/1999 | Estelle | |
| 6,147,813 A | 11/2000 | Iwasaki | |
| 6,181,480 B1 | 1/2001 | Ito | |
| 6,226,132 B1 | 5/2001 | Abe | |
| 2019/0278081 A1 | 9/2019 | Kuo et al. | |
| 2019/0374944 A1 | 12/2019 | Lundquist et al. | |

FOREIGN PATENT DOCUMENTS

| | | |
|---|---|---|
| CN | 210323553 U | 4/2020 |
| CN | 111308688 A | 6/2020 |
| CN | 111399186 A | 7/2020 |
| IN | 1341/DEL/2015 A | 8/2016 |
| JP | S5336226 A | 4/1978 |
| JP | H06300988 A | 10/1994 |
| JP | H0763997 A | 3/1995 |
| JP | H07294815 A | 11/1995 |
| JP | H112760 A | 1/1999 |
| JP | H11109259 A | 4/1999 |
| JP | 2000098266 A | 4/2000 |
| JP | 2007094278 A | 4/2007 |
| JP | 2007233286 A | 9/2007 |
| WO | 2020045517 A1 | 3/2020 |
| WO | 2021184167 A1 | 9/2021 |
| WO | 2021217504 A1 | 11/2021 |

* cited by examiner

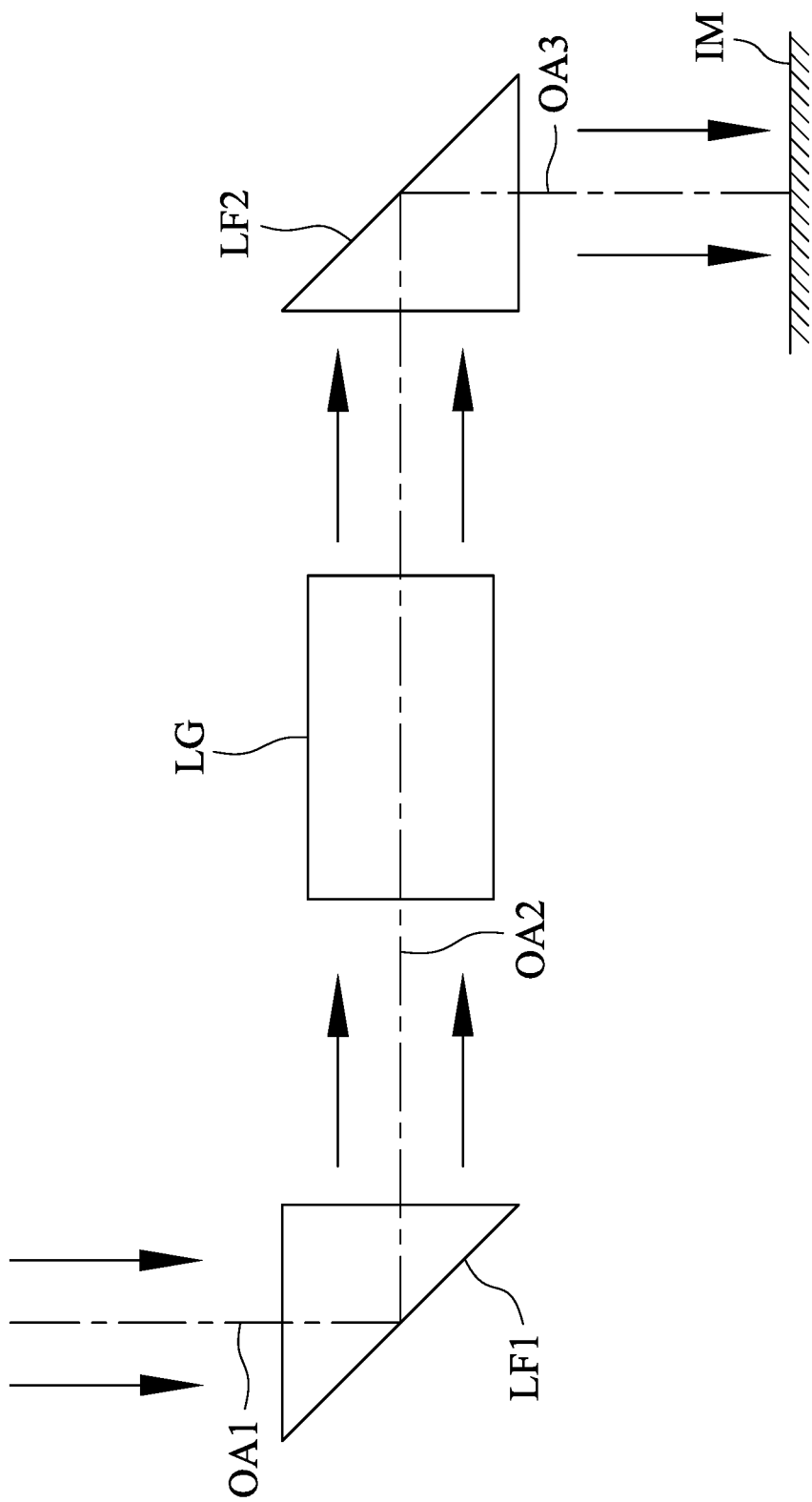

IMAGE CAPTURING OPTICAL LENS ASSEMBLY, IMAGING APPARATUS AND ELECTRONIC DEVICE

RELATED APPLICATIONS

This application claims priority to Taiwan Application Serial Number 109114928, filed May 5, 2020, which is herein incorporated by reference.

BACKGROUND

Technical Field

The present disclosure relates to an image capturing optical lens assembly and an imaging apparatus. More particularly, the present disclosure relates to an image capturing optical lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an optical lens assembly that meets the aforementioned needs.

SUMMARY

According to one aspect of the present disclosure, an image capturing optical lens assembly includes three lens elements, the three lens elements are, in order from an object side to an image side along an optical path, a first lens element, a second lens element and a third lens element. Each of the three lens elements has an object-side surface towards the object side and an image-side surface towards the image side. The second lens element has negative refractive power. The object-side surface of the third lens element is concave in a paraxial region thereof, and the image-side surface of the third lens element is convex in a paraxial region thereof. The image capturing optical lens assembly has a total of three lens elements. When an axial distance between the first lens element and the second lens element is T12, an axial distance between the second lens element and the third lens element is T23, a central thickness of the first lens element is CT1, a central thickness of the second lens element is CT2, a central thickness of the third lens element is CT3, a focal length of the image capturing optical lens assembly is f, an axial distance between the object-side surface of the first lens element and the image-side surface of the third lens element is TD, and a maximum image height of the image capturing optical lens assembly is ImgH, the following conditions are satisfied: $0.10<(T12+T23)/(CT1+CT2+CT3)<1.6$; $3.00<f/TD<100$; and $1.0<TD/ImgH<5.0$.

According to another aspect of the present disclosure, an image capturing optical lens assembly includes three lens elements, the three lens elements are, in order from an object side to an image side along an optical path, a first lens element, a second lens element and a third lens element. Each of the three lens elements has an object-side surface towards the object side and an image-side surface towards the image side. The first lens element has positive refractive power. The image-side surface of the second lens element is concave in a paraxial region thereof. The object-side surface of the third lens element is concave in a paraxial region thereof, and the image-side surface of the third lens element is convex in a paraxial region thereof. The image capturing optical lens assembly has a total of three lens elements. When an axial distance between the first lens element and the second lens element is T12, an axial distance between the second lens element and the third lens element is T23, a central thickness of the first lens element is CT1, a central thickness of the second lens element is CT2, a central thickness of the third lens element is CT3, a focal length of the image capturing optical lens assembly is f, an axial distance between the object-side surface of the first lens element and the image-side surface of the third lens element is TD, and a maximum image height of the image capturing optical lens assembly is ImgH, the following conditions are satisfied: $0<(T12+T23)/(CT1+CT2+CT3)<2.0$; $3.00<f/TD<8.00$; and $1.0<TD/ImgH<5.0$.

According to another aspect of the present disclosure, an image capturing optical lens assembly includes three lens elements, the three lens elements are, in order from an object side to an image side along an optical path, a first lens element, a second lens element and a third lens element. Each of the three lens elements has an object-side surface towards the object side and an image-side surface towards the image side. The second lens element has negative refractive power. The object-side surface of the third lens element is concave in a paraxial region thereof. The image capturing optical lens assembly has a total of three lens elements. When an axial distance between the first lens element and the second lens element is T12, an axial distance between the second lens element and the third lens element is T23, a central thickness of the first lens element is CT1, a central thickness of the second lens element is CT2, a central thickness of the third lens element is CT3, a focal length of the image capturing optical lens assembly is f, an axial distance between the object-side surface of the first lens element and the image-side surface of the third lens element is TD, and a maximum image height of the image capturing optical lens assembly is ImgH, the following conditions are satisfied: $0.10<(T12+T23)/(CT1+CT2+CT3)<1.1$; $3.00<f/TD<11.5$; and $1.0<TD/ImgH<5.0$.

According to another aspect of the present disclosure, an imaging apparatus includes the image capturing optical lens assembly of the aforementioned aspect and an image sensor disposed on an image surface of the image capturing optical lens assembly.

According to another aspect of the present disclosure, an electronic device includes at least three imaging apparatuses located on the same side of the electronic device. At least one of the at least three imaging apparatuses is the imaging apparatus of the aforementioned aspect, and at least one of the at least three imaging apparatuses includes at least one reflective member.

BRIEF DESCRIPTION OF THE DRAWINGS

The present disclosure can be more fully understood by reading the following detailed description of the embodiment, with reference made to the accompanying drawings as follows:

FIG. 27C is a schematic view of an arrangement of two light path folding elements in the image capturing optical lens assembly of the present disclosure.

DETAILED DESCRIPTION

Figure 1:
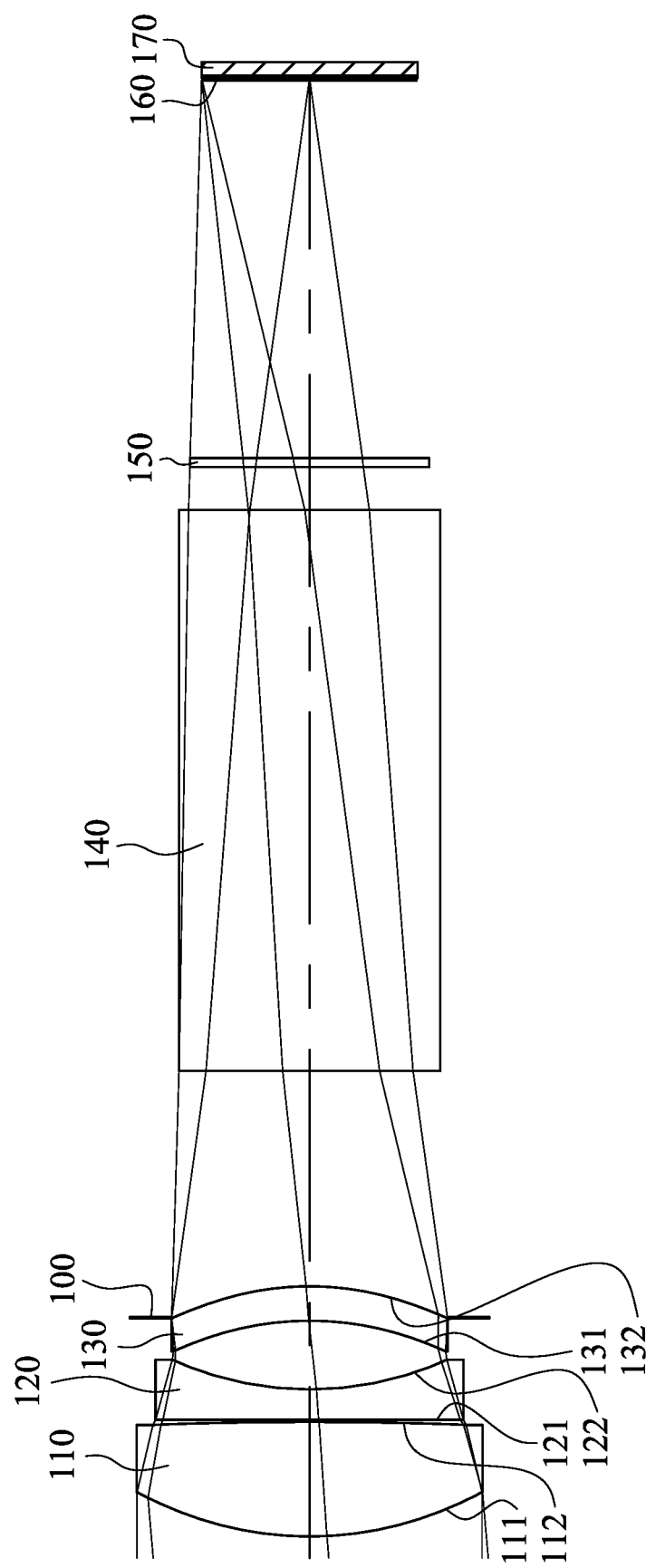
FIG. 1 is a schematic view of an imaging apparatus according to the 1st embodiment of the present disclosure.

An image capturing optical lens assembly includes three lens elements, which are, in order from an object side to an image side along an optical path, a first lens element, a second lens element and a third lens element. Each of the three lens elements has an object-side surface towards the object side and an image-side surface towards the image side. The image capturing optical lens assembly has a total of three lens elements.

The first lens element can have positive refractive power, so that it is favorable for compressing a volume of the image capturing optical lens assembly. The object-side surface of the first lens element can be convex in a paraxial region thereof, so that it is favorable for adjusting the refractive power of the first lens element.

The second lens element can have negative refractive power; so that it is favorable for balancing aberrations generated due to compression of the volume of the image capturing optical lens assembly. The image-side surface of the second lens element can be concave in a paraxial region thereof, so that it is favorable for correcting aberrations, such as astigmatism.

The object-side surface of the third lens element is concave in a paraxial region thereof, so that it is favorable for reducing the difficulty of assembling by adjusting the surface shape of the third lens element. The image-side surface of the third lens element can be convex in a paraxial region thereof, so that it is favorable for reducing aberrations and temperature influence on imaging by adjusting the surface shape and the refractive power of the third lens element.

When an axial distance between the first lens element and the second lens element is T12, an axial distance between the second lens element and the third lens element is T23, a central thickness of the first lens element is CT1, a central thickness of the second lens element is CT2, and a central thickness of the third lens element is CT3, the following condition is satisfied: $0<(T12+T23)/(CT1+CT2+CT3)<2.0$. Therefore, it is favorable for compressing the volume of the image capturing optical lens assembly by configuring the distribution of the lens elements. Moreover, the following condition can be satisfied: $0.10<(T12+T23)/(CT1+CT2+CT3)<1.6$. Further, the following condition can be satisfied: $0.10<(T12+T23)/(CT1+CT2+CT3)<1.1$. Furthermore, the following condition can be satisfied: $0.20<(T12+T23)/(CT1+CT2+CT3)<0.90$. Also, the following condition can be satisfied: $0.20<(T12+T23)/(CT1+CT2+CT3)<0.70$.

When a focal length of the image capturing optical lens assembly is f, and an axial distance between the object-side surface of the first lens element and the image-side surface of the third lens element is TD, the following condition is satisfied: 3.00<f/TD, so that it is favorable for providing a telephoto configuration and compressing the volume of the lens elements; or the following condition is satisfied: f/TD<100, so that it is favorable for avoiding too small field of view and enhancing the image quality. Moreover, the following conditions can be satisfied: 3.30<f/TD; 3.60<f/TD; 3.90<f/TD; f/TD<40.0; f/TD<20.0; f/TD<11.5; f/TD<8.00; or f/TD<6.90. Furthermore, the following conditions can be satisfied: 3.00<f/TD<100; 3.00<f/TD<11.5; 3.00<f/TD<8.00; 3.30<f/TD<8.00; or 3.30<f/TD<6.90.

When the axial distance between the object-side surface of the first lens element and the image-side surface of the third lens element is TD, and a maximum image height of the image capturing optical lens assembly is ImgH, the following condition is satisfied: 1.0<TD/ImgH<5.0. Therefore, it is favorable for balancing between the volume and the size of an image surface and providing a telephoto configuration. Moreover, the following condition can be satisfied: 1.3<TD/ImgH<4.0. Furthermore, the following condition can be satisfied: 1.8<TD/ImgH<3.0.

When a maximum among all axial distances between adjacent lens elements of the image capturing optical lens assembly is ATmax, and a minimum among central thicknesses of all lens elements of the image capturing optical lens assembly is CTmin, the following condition is satisfied: 0.60<ATmax/CTmin<7.0. Therefore, it is favorable for compressing the volume of the image capturing optical lens assembly by configuring the distribution of the lens elements. Moreover, the following condition can be satisfied: 0.90<ATmax/CTmin<5.0.

When a refractive index of the third lens element is N3, the following condition is satisfied: 1.40<N3<1.60. Therefore, it is favorable for maintaining proper back focal length and reducing temperature influence on imaging by adjusting the material of the third lens element.

When the central thickness of the first lens element is CT1, the central thickness of the second lens element is CT2, and the central thickness of the third lens element is CT3, the following condition is satisfied: 1.4<(CT1+CT3)/CT2<8.1. Therefore, it is favorable for compressing the volume of the lens elements and reducing temperature influence on imaging by the cooperation among the three lens elements. Moreover, the following condition can be satisfied: 1.6<(CT1+CT3)/CT2<6.0.

When a refractive index of the first lens element is N1, and a refractive index of the second lens element is N2, the following condition is satisfied: 3.50<N1+N2<4.00. Therefore, it is favorable for compressing the volume and correcting aberrations by a proper selection of materials of the first lens element and the second lens element.

When a curvature radius of the object-side surface of the third lens element is R5, and a curvature radius of the image-side surface of the third lens element is R6, the following condition is satisfied: 4.0<|(R5+R6)/(R5−R6)|. Therefore, it is favorable for adjusting the back focal length by adjusting the surface shape of the third lens element. Moreover, the following condition can be satisfied: 7.0<|(R5+R6)/(R5−R6)|.

When the focal length of the image capturing optical lens assembly is f, and a focal length of the third lens element is f3, the following condition is satisfied: −0.50<f/f3<1.0. Therefore, it is favorable for maintaining proper back focal length and reducing temperature influence on imaging by adjusting the refractive power of the third lens element. Moreover, the following condition can be satisfied: −0.45<f/f3<0.85.

When the maximum image height of the image capturing optical lens assembly is imgH, and a maximum distance between an optical effective area of the object-side surface of the first lens element and an optical axis is Y11, the following condition is satisfied: 0.45<ImgH/Y11<1.1. Therefore, it is favorable for balancing between compressing the outer diameter of the lens elements and enlarging the area of the image surface. Moreover, the following condition can be satisfied: 0.55<ImgH/Y11<0.85.

When the maximum image height of the image capturing optical lens assembly is ImgH, and a maximum distance between an optical effective area of the image-side surface of the third lens element and the optical axis is Y32, the following condition is satisfied: 0.50<ImgH/Y32<1.1. Therefore, it is favorable for providing a telephoto configuration by adjusting the optical path between the third lens element and the image surface. Moreover, the following condition can be satisfied: 0.60<ImgH/Y32<0.95.

When the maximum distance between the optical effective area of the object-side surface of the first lens element and the optical axis is Y11, and the maximum distance between the optical effective area of the image-side surface of the third lens element and the optical axis is Y32, the following condition is satisfied: 0.90<Y11/Y32<1.5. Therefore, it is favorable for compressing the outer diameter of the lens elements and providing a telephoto configuration by adjusting the outer diameter of the lens elements.

An optical effective area of at least one of the three lens elements can include a non-circular shape, so that it is favorable for various applications by compressing the volume of the lens elements. Moreover, the optical effective areas of each of at least two or at least three of the three lens elements can include a non-circular shape. Further, openings of other elements, such as barrel, light blocking element and aperture, of the image capturing optical lens assembly can also include non-circular shapes, so that it is favorable for compressing the volume. The non-circular shape can include at least one arc side and at least one straight side, so that it is favorable for reducing difficulty in manufacturing the non-circular shapes of the lens elements arranged by the arc side and the straight side. Furthermore, the non-circular shape can include at least two arc sides and at least two straight sides. The at least two straight sides can be parallel to each other, so that it is favorable for reducing difficulty in manufacturing the non-circular shapes of the lens elements and increasing assembling yield rate. When a radius of each of the at least two arc sides is Y, and a vertical distance between each of the at least two straight sides and the optical axis is D, the following condition is satisfied: 1.1<Y/D<2.0. Therefore, it is favorable for maintaining the image quality as compressing the volume of the lens elements by adjusting the ratio of the arc sides and the straight sides. Moreover, the following condition can be satisfied: 1.3<Y/D<1.8.

At least two of the three lens elements are made of glass material, so that it is favorable for reducing temperature influence on imaging. Moreover, the first lens element and the second lens element of the three lens elements can be both made of glass material, so that it is favorable for reducing sensitivity of the image capturing optical lens assembly and temperature influence on imaging.

At least one of the three lens elements is made of plastic material, so that it is favorable for mass production, correcting aberrations and reducing weight. Moreover, the third lens element can be made of plastic material, so that it is favorable for reducing temperature influence on imaging in cooperation with other lens elements. The object-side surface and the image-side surface of at least one of the three lens elements are both aspheric, so that it is favorable for compressing the volume and enhancing the image quality by increasing the variation of the surfaces of the lens elements. Furthermore, at least one of the three lens elements is made of plastic material and has the object-side surface and the image-side surface being both aspheric.

When an Abbe number of the second lens element is V2, the following condition is satisfied: $13.0<V2<27.0$. Therefore, it is favorable for correcting aberrations, such as chromatic aberration, by adjusting the material of the second lens element. Moreover, the following condition can be satisfied: $15.0<V2<24.5$.

When the axial distance between the first lens element and the second lens element is T12, and the axial distance between the second lens element and the third lens element is T23, the following condition is satisfied: $3.00<T23/T12<200$. Therefore, it is favorable for compressing the volume of the lens elements by the cooperation among the lens elements. Moreover, the following condition can be satisfied: $4.50 \leq T23/T12<100$.

When an f-number of the image capturing optical lens assembly is Fno, the following condition is satisfied: $2.0<Fno<5.5$. Therefore, it is favorable for balancing between the illuminance and the depth of field and providing a telephoto configuration. Moreover, the following condition can be satisfied: $2.5<Fno<4.5$. Furthermore, the following condition can be satisfied: $3.0<Fno<4.0$.

When the focal length of the image capturing optical lens assembly is f, a focal length of the first lens element is f1, a focal length of the second lens element is f2, and the focal length of the third lens element is f3, the following condition is satisfied: $3.0<|f/f1|+|f/f2|+|f/f3|<7.0$. Therefore, it is favorable for providing a telephoto configuration and reducing sensitivity of each of the lens elements.

When half of a maximum field of view of the image capturing optical lens assembly is HFOV, the following condition is satisfied: 3.0 degrees$<$HFOV$<$9.0 degrees. Therefore, it is favorable for providing proper field of view of the image capturing optical lens assembly for telephoto applications. Moreover, the following condition can be satisfied: 4.0 degrees$<$HFOV$<$6.0 degrees.

When the focal length of the image capturing optical lens assembly is f, and the curvature radius of the object-side surface of the third lens element is R5, the following condition is satisfied: $-10<f/R5<-3.4$. Therefore, it is favorable for providing a telephoto configuration by adjusting the surface shape and the refractive power of the third lens element.

When the focal length of the image capturing optical lens assembly is f, and the curvature radius of the image-side surface of the third lens element is R6, the following condition is satisfied: $-10<f/R6<-3.4$. Therefore, it is favorable for reducing temperature influence on imaging by adjusting the surface shape and the refractive power of the third lens element.

When the focal length of the first lens element is f1, the focal length of the second lens element is f2, and the focal length of the third lens element is f3, the following condition is satisfied: $4.0<|f3/f1|+|f3/f2|$. Therefore, it is favorable for providing a telephoto configuration and reducing temperature influence on imaging by adjusting the refractive power distribution of the lens elements. Moreover, the following condition can be satisfied: $8.0<|f3/f1|+|f3/f2|$.

When the focal length of the image capturing optical lens assembly is f, and the focal length of the second lens element is f2, the following condition is satisfied: $-3.3<f/f2<-1.0$. Therefore, it is favorable for correcting aberrations and adjusting field of view by adjusting the refractive power of the second lens element.

When an axial distance between the image-side surface of the third lens element and an image surface is BL, and the axial distance between the object-side surface of the first lens element and the image-side surface of the third lens element is TD, the following condition is satisfied: $3.3<BL/TD<6.5$. Therefore, it is favorable for adjusting the volume distribution and field of view by adjusting the distribution of the lens elements and back focal length.

When a minimum among Abbe numbers of all lens elements of the image capturing optical lens assembly is Vmin, the following condition is satisfied: $14.0<Vmin<27.0$. Therefore, it is favorable for correcting aberrations, such as chromatic aberration, by arranging the distribution of materials of the lens elements.

When the refractive index of the first lens element is N1, the refractive index of the second lens element is N2, and the refractive index of the third lens element is N3, the following condition is satisfied: $2.25<(N1+N2)/N3<3.00$. Therefore, it is favorable for compressing the volume, correcting aberrations and reducing temperature influence on imaging by arranging the distribution of materials of the lens elements.

When the focal length of the image capturing optical lens assembly is f, the curvature radius of the object-side surface of the third lens element is R5, and the curvature radius of the image-side surface of the third lens element is R6, the following condition is satisfied: $-25<f/R5+f/R6<-5.0$. Therefore, it is favorable for providing a telephoto configuration by adjusting the surface shape and the refractive power of the third lens element. Moreover, the following condition can be satisfied: $-14<f/R5+f/R6<-6.5$.

When the central thickness of the first lens element is CT1, the central thickness of the second lens element is CT2, and the axial distance between the first lens element and the second lens element is T12, the following condition is satisfied: $6.00<(CT1+CT2)/T12<200$. Therefore, it is favorable for correcting aberrations, such as spherical aberration, by the cooperation between the first lens element and the second lens element. Moreover, the following condition can be satisfied: $8.00<(CT1+CT2)/T12<55.0$.

When the axial distance between the object-side surface of the first lens element and the image-side surface of the third lens element is TD, and an entrance pupil diameter of the image capturing optical lens assembly is EPD, the following condition is satisfied: $0.50<TD/EPD<0.90$. Therefore, it is favorable for balancing between the volume and the aperture size.

When the focal length of the image capturing optical lens assembly is f, and the maximum image height of the image capturing optical lens assembly is ImgH, the following condition is satisfied: $10.0<f/ImgH<15.0$. Therefore, it is favorable for balancing between field of view and the size of an image surface and providing a telephoto configuration.

When a composite focal length of the first lens element and the second lens element is f12, and the focal length of the third lens element is f3, the following condition is satisfied: $-0.30<f12/f3<15$. Therefore, it is favorable for reducing temperature influence on imaging by adjusting the refractive power distribution of the lens elements. Moreover, the following condition can be satisfied: $0.10<f12/f3<7.0$. Furthermore, the following condition can be satisfied: $0.20<f12/f3<2.5$.

When the focal length of the image capturing optical lens assembly is f, and the focal length of the first lens element is f1, the following condition is satisfied: $1.00<f/f1≤3.37$. Therefore, it is favorable for compressing the volume and reducing temperature influence on imaging by adjusting the refractive power of the first lens element.

The image capturing optical lens assembly can further include at least one object-side reflective member and at least one image-side reflective member. The object-side reflective member is disposed at an object side of the first lens element, the image-side reflective member is disposed at an image side of the third lens element, and each of the object-side reflective member and the image-side reflective member can be a prism or a mirror. The image-side reflective member can have at least two reflective surfaces, which will not be limited to the present disclosure. Therefore, it is favorable for flexible space arrangement, reducing limitation of the mechanism and wider range of applications of the image capturing optical lens assembly. The image-side reflective member can further have at least one prism, so that it is favorable for reducing the difficulty of assembling and compressing optical path length. When a sum of central thickness of the at least one prism of the at least one image-side reflective member of the image capturing optical lens assembly is ΣCTP, and the axial distance between the object-side surface of the first lens element and the image-side surface of the third lens element is TD, the following condition is satisfied: $1.0<ΣCTP/TD<3.5$. Therefore, it is favorable for adjusting the volume distribution and providing a telephoto configuration by adjusting the arrangement of the lens elements and the prism. Moreover, the following condition can be satisfied: $1.5<ΣCTP/TD<3.0$.

Each of the aforementioned features of the image capturing optical lens assembly can be utilized in various combinations for achieving the corresponding effects.

According to the image capturing optical lens assembly of the present disclosure, the lens elements thereof can be made of glass or plastic materials. When the lens elements are made of glass materials, the distribution of the refractive power of the image capturing optical lens assembly may be more flexible to design. The glass lens element can either be made by grinding or molding. When the lens elements are made of plastic materials, manufacturing costs can be effectively reduced. Furthermore, surfaces of each lens element can be arranged to be spherical or aspheric (ASP), wherein it is easier to fabricate the spherical surface. If the surfaces are arranged to be aspheric, more controllable variables can be obtained for eliminating aberrations thereof, and to further decrease the required amount of lens elements in the image capturing optical lens assembly. Therefore, the total track length of the image capturing optical lens assembly can also be reduced. The aspheric surfaces may be formed by plastic injection molding or glass molding.

According to the image capturing optical lens assembly of the present disclosure, one or more of the lens material may optionally include an additive which alters the lens transmittance in a specific range of wavelength for reducing unwanted stray light or color deviation. For example, the additive may optionally filter out light in the wavelength range of 600 nm-800 nm for reducing excessive red light and/or near infra-red light, or may optionally filter out light in the wavelength range of 350 nm-450 nm to reduce excessive blue light and/or near ultra-violet light from interfering the final image. The additive may be homogenously mixed with plastic material to be used in manufacturing a mixed-material lens element by injection molding.

According to the image capturing optical lens assembly of the present disclosure, when a surface of a lens element is aspheric, it indicates that the surface has an aspheric shape throughout its optically effective area or a portion(s) thereof.

According to the image capturing optical lens assembly of the present disclosure, when the lens element has a convex surface, it indicates that the surface can be convex in the paraxial region thereof; when the lens element has a concave surface, it indicates that the surface can be concave in the paraxial region thereof. According to the image capturing optical lens assembly of the present disclosure, the refractive power or the focal length of a lens element being positive or negative may refer to the refractive power or the focal length in a paraxial region of the lens element.

According to the image capturing optical lens assembly of the present disclosure, the image surface of the image capturing optical lens assembly, based on the corresponding image sensor, can be planar or curved. In particular, the image surface can be a concave curved surface facing towards the object side. According to the image capturing optical lens assembly of the present disclosure, at least one image correcting element (such as a field flattener) can be selectively disposed between the lens element closest to the image side of the image capturing optical lens assembly and the image surface on an imaging optical path so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface towards the object side and is disposed close to the image surface.

Figure 27A:
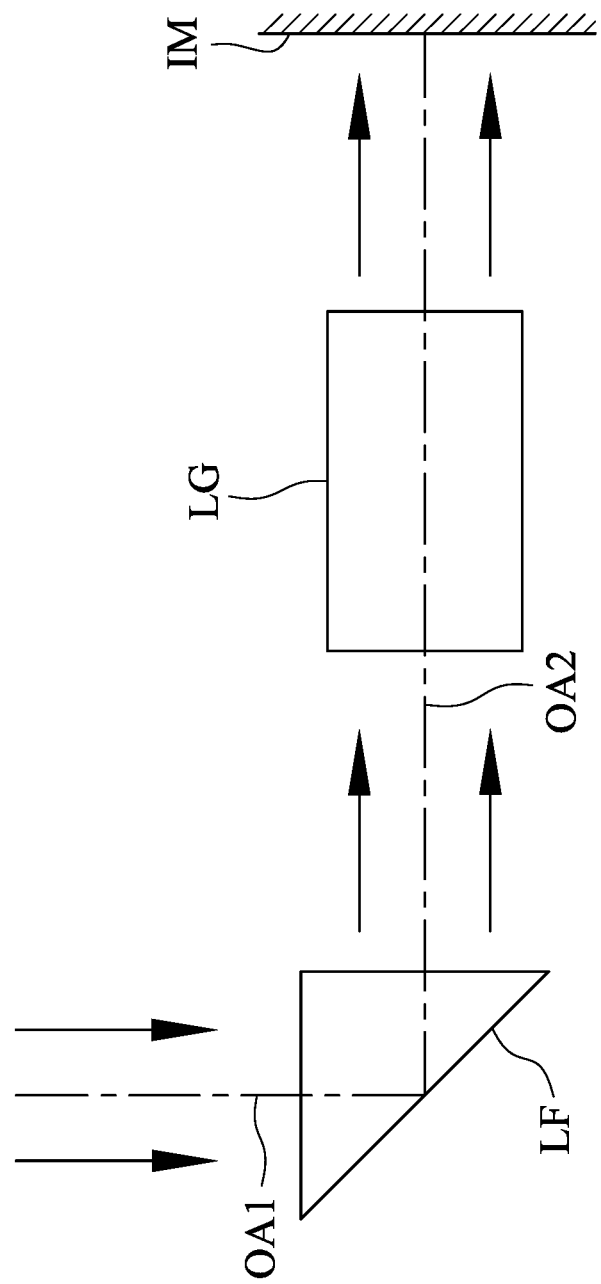
FIG. 27A is a schematic view of an arrangement of a light path folding element in the image capturing optical lens assembly of the present disclosure.
Figure 27B:
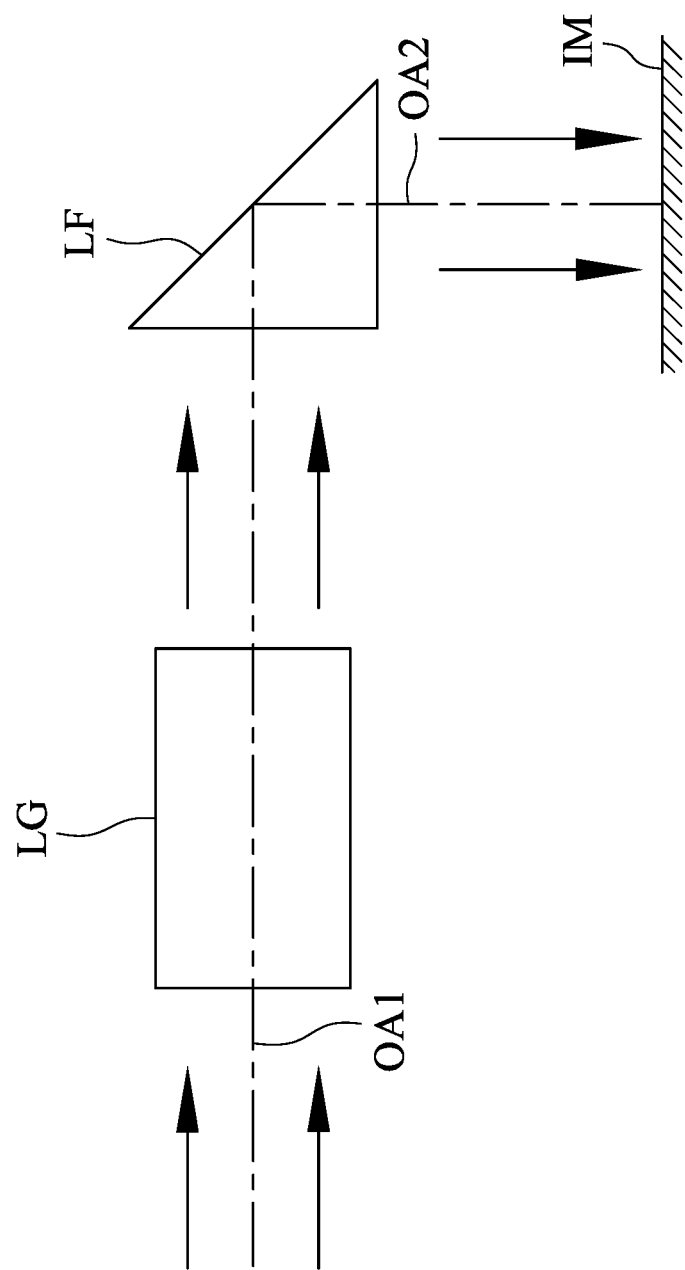
FIG. 27B is a schematic view of another arrangement of the light path folding element in the image capturing optical lens assembly of the present disclosure.

According to the image capturing optical lens assembly of the present disclosure, at least one element with light path folding function can be selectively disposed between the imaged object and the image surface, such as a prism or a mirror. Therefore it is favorable for providing high flexible space arrangement of the image capturing optical lens assembly, so that the compactness of the electronic device would not be restricted by the optical total track length of the image capturing optical lens assembly. FIG. 27A is a schematic view of an arrangement of a light path folding element LF in the image capturing optical lens assembly of the present disclosure. FIG. 27B is a schematic view of another arrangement of the light path folding element LF in the image capturing optical lens assembly of the present disclosure. As shown in FIGS. 27A and 27B, the image capturing optical lens assembly includes, in order from an imaged object (not shown in drawings) to an image surface IM, a first optical axis OA1, the light path folding element LF and a second optical axis OA2, wherein the light path folding element LF can be disposed between the imaged object and a lens group LG of the image capturing optical lens assembly as shown in FIG. 27A, or can be disposed between the lens group LG of the image capturing optical lens assembly and the image surface IM as shown in FIG. 27B. Moreover, FIG. 27C is a schematic view of an arrangement of two light path folding elements LF1, LF2 in the image capturing optical lens assembly of the present disclosure. As shown in FIG. 27C, the image capturing optical lens assembly includes, in order from an imaged object (not shown in drawings) to an image surface IM, a first optical axis OA1, the light path folding element LF1, a second optical axis OA2, the light path folding element LF2 and a third optical axis OA3, wherein the light path folding element LF1 is disposed between the imaged object and a lens group LG of the image capturing optical lens assembly, and the light path folding element LF2 is disposed between the lens group LG of the image capturing optical lens assembly and the image surface IM. The image capturing optical lens assembly can also be selectively disposed with three or more light path folding element, the type, amount and location of the light path folding element will not be limited to the present disclosure.

According to the image capturing optical lens assembly of the present disclosure, the object side and the image side can be along the direction of the optical axis. The data (such as ΣCTP, BL and TD) can be measured along the optical axis if the optical axis is folded.

According to the image capturing optical lens assembly of the present disclosure, the image capturing optical lens assembly can include at least one stop, such as an aperture stop, a glare stop or a field stop. Said glare stop or said field stop is for eliminating the stray light and thereby improving the image resolution thereof.

According to the image capturing optical lens assembly of the present disclosure, an aperture stop can be configured as a front stop or a middle stop. A front stop disposed between the object and the first lens element can provide a longer distance between an exit pupil of the image capturing optical lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the image capturing optical lens assembly and thereby provides a wider field of view for the same.

According to the image capturing optical lens assembly of the present disclosure, an aperture adjusting unit can be properly configured. The aperture adjusting unit can be a mechanical part or a light control part, and the dimension and the shape of the aperture adjusting unit can be electrically controlled. The mechanical part can include a moveable component such as a blade group or a shielding plate. The light control part can include a screen component such as a light filter, electrochromic material, a liquid crystal layer or the like. The amount of incident light or the exposure time of the image can be controlled by the aperture adjusting unit to enhance the image moderation ability. In addition, the aperture adjusting unit can be the aperture stop of the image capturing optical lens assembly according to the present disclosure, so as to moderate the image properties such as depth of field or the exposure speed by changing f-number.

According to the image capturing optical lens assembly of the present disclosure, the image capturing optical lens assembly can be applied to 3D (three-dimensional) image capturing applications, in products such as digital cameras, mobile devices, digital tablets, smart TVs, surveillance systems, motion sensing input devices, driving recording systems, rearview camera systems, wearable devices, and unmanned aerial vehicles.

According to the present disclosure, an imaging apparatus is provided. The imaging apparatus includes the aforementioned image capturing optical lens assembly and an image sensor, wherein the image sensor is disposed on the image side of the aforementioned image capturing optical lens assembly, that is, the image sensor can be disposed on or near the image surface of the aforementioned image capturing optical lens assembly. It is favorable for compressing the volume of the image capturing optical lens assembly, providing a telephoto configuration and enhancing the image quality by configuring the distribution of the lens elements. Preferably, the imaging apparatus can further include a barrel member, a holder member or a combination thereof.

Furthermore, the imaging apparatus can include a focusing function, so that it is favorable for wider range of applications, such as auto-focusing application. The image capturing optical lens assembly of the imaging apparatus can include at least one image-side reflective member. The image-side reflective member can be driven by a driving apparatus and moves relative to the image sensor during the focusing process, so that it is favorable for enhancing the focusing function. The movable reflective member can reduce the moving distance as focusing especially for the telephoto imaging apparatus. The imaging apparatus can include optical image stabilizing function, so that it is favorable for wider range of applications. The image capturing optical lens assembly of the imaging apparatus can include at least one object-side reflective member. The object-side reflective member can be tilted by the driving apparatus, so that it is favorable for instantly image tilt compensation and achieving the optical image stabilizing function.

According to the present disclosure, an electronic device is provided, wherein the electronic device includes the aforementioned imaging apparatus. Therefore, it is favorable for enhancing the image quality. Preferably, the electronic device can further include, but not limited to, a control unit, a display, a storage unit, a random access memory unit (RAM) or a combination thereof.

Furthermore, the electronic device can include at least three imaging apparatuses located on the same side of the electronic device, so that it is favorable for fluent operation and wider range of applications. In the electronic device, at least one of the at least three imaging apparatuses is the aforementioned imaging apparatus, and at least one of the at least three imaging apparatuses can include at least one reflective member, so that it is favorable for flexible space arrangement, reducing limitation of the mechanism and wider range of applications. Moreover, each of at least two of the at least three imaging apparatuses can include at least one of the reflective member; or at least one of the at least three imaging apparatuses can include at least two of the reflective member.

According to the above description of the present disclosure, the following specific embodiments are provided for further explanation.

1st Embodiment

Figure 2:
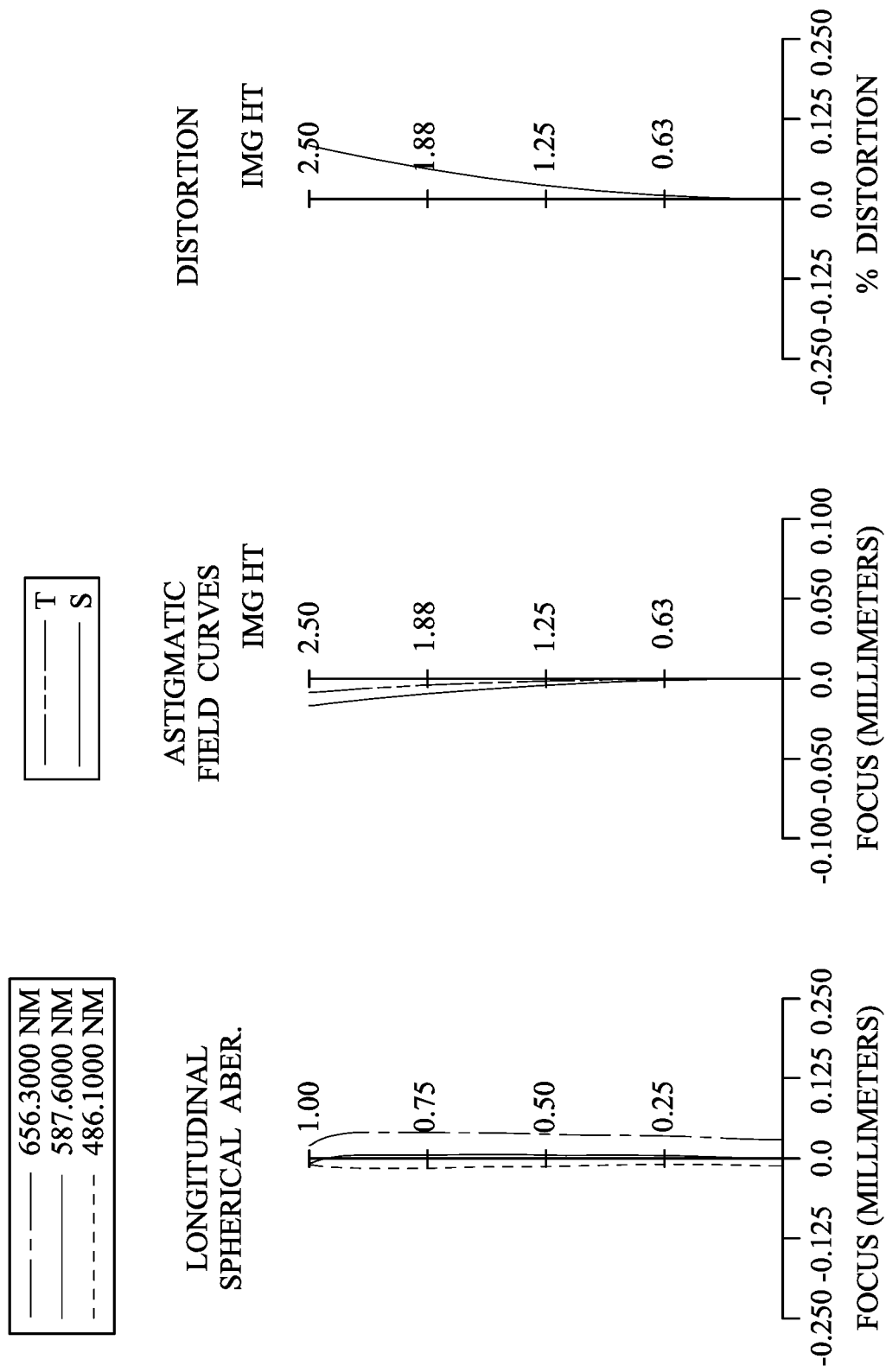
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows, in order from left to right, spherical aberration curves, astigmatic field curves and a distortion curve of the imaging apparatus of the 1st embodiment. In FIG. 1, the imaging apparatus according to the 1st embodiment includes an image capturing optical lens assembly (its reference number is omitted) and an image sensor 170. The image capturing optical lens assembly includes, in order from an object side to an image side along an optical path, a first lens element 110, a second lens element 120, a third lens element 130, an aperture stop 100, a prism 140, a filter 150 and an image surface 160, wherein the image sensor 170 is disposed on the image surface 160 of the image capturing optical lens assembly. The image capturing optical lens assembly includes three lens elements (110, 120, 130) without additional one or more lens elements inserted between the first lens element 110 and the third lens element 130.

The first lens element 110 with positive refractive power has an object-side surface 111 being convex in a paraxial region thereof and an image-side surface 112 being convex in a paraxial region thereof. The first lens element 110 is made of glass material, and has the object-side surface 111 and the image-side surface 112 being both aspheric.

The second lens element 120 with negative refractive power has an object-side surface 121 being planar in a paraxial region thereof and an image-side surface 122 being concave in a paraxial region thereof. The second lens element 120 is made of glass material.

The third lens element 130 with positive refractive power has an object-side surface 131 being concave in a paraxial region thereof and an image-side surface 132 being convex in a paraxial region thereof. The third lens element 130 is made of plastic material, and has the object-side surface 131 and the image-side surface 132 being both aspheric.

The prism 140 is made of glass material and disposed at an image side of the third lens element 130. The prism 140 can be taken as the image-side reflective member of the image capturing optical lens assembly.

The filter 150 is made of glass material and disposed between the prism 140 and the image surface 160 and will not affect a focal length of the image capturing optical lens assembly.

The equation of the aspheric surface profiles of the aforementioned lens elements is expressed as follows:

$$X(Y) = (Y^2/R)/(1 + sqrt(1 - (1+k) \times (Y/R)^2)) + \sum_{i} (Ai) \times (Y^i);$$

wherein,

X is a displacement in parallel with an optical axis from the intersection point of the aspheric surface and the optical axis to a point at a distance Y from the optical axis on the aspheric surface;

Y is the vertical distance from the point on the aspheric surface to the optical axis;

R is the curvature radius;

k is the conic coefficient; and

Ai is the i-th aspheric coefficient.

In the image capturing optical lens assembly according to the 1st embodiment, when a focal length of the image capturing optical lens assembly is f, an f-number of the image capturing optical lens assembly is Fno, and half of a maximum field of view of the image capturing optical lens assembly is HFOV, these parameters have the following values: f=29.02 mm; Fno=3.63; and HFOV=4.9 degrees.

In the image capturing optical lens assembly according to the 1st embodiment, when a refractive index of the first lens element 110 is N1, a refractive index of the second lens element 120 is N2, and a refractive index of the third lens element 130 is N3, the following conditions are satisfied: N1+N2=3.637; (N1+N2)/N3=2.36; and N3=1.544.

In the image capturing optical lens assembly according to the 1st embodiment, when an Abbe number of the first lens element 110 is V1, an Abbe number of the second lens element 120 is V2, an Abbe number of the third lens element 130 is V3, and a minimum among Abbe numbers of all lens elements of the image capturing optical lens assembly is Vmin, the following conditions are satisfied: V2=26.1; and Vmin=26.1. In the 1st embodiment, Vmin is a minimum among V1, V2 and V3, and Vmin=V2.

Figure 17:
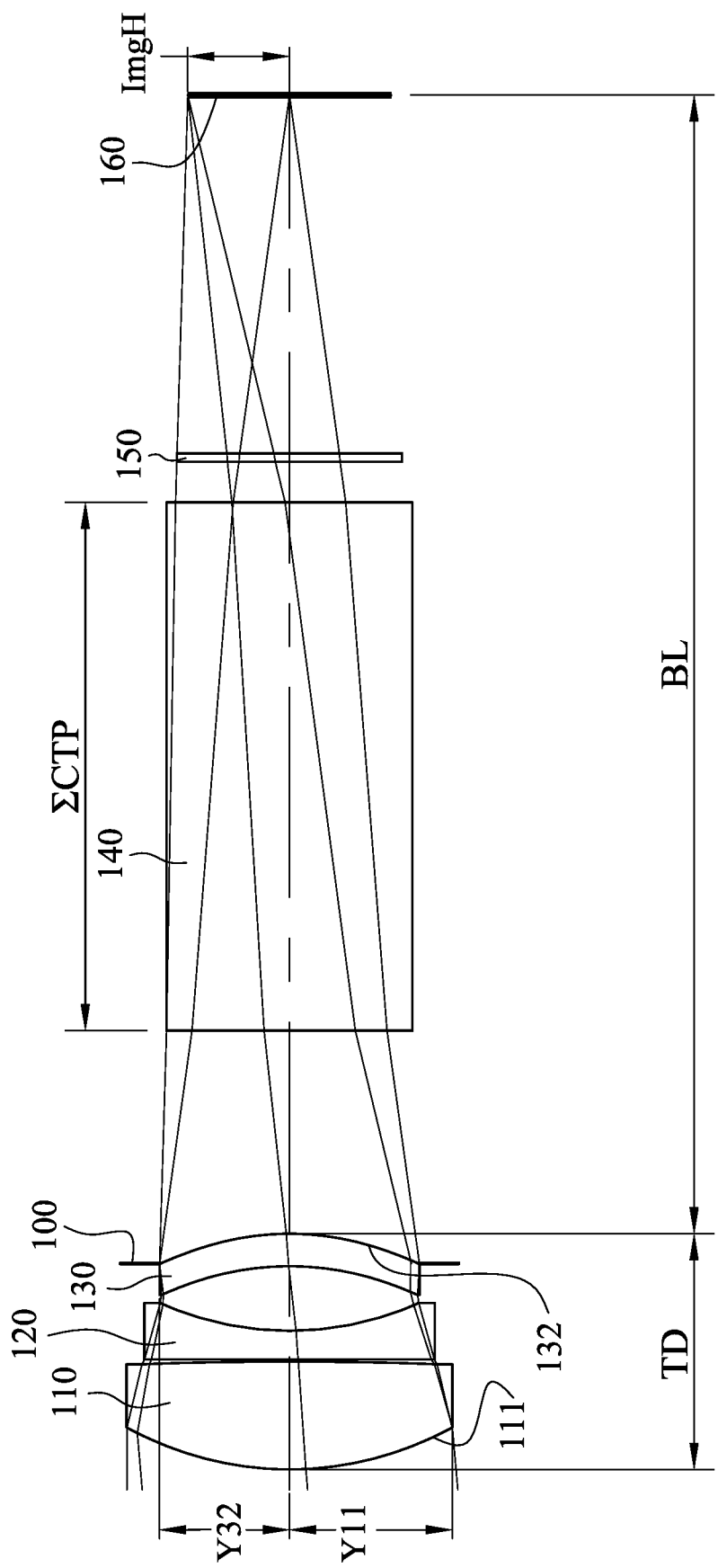
FIG. 17 is a schematic view of partial parameters according to the 1st embodiment of FIG. 1.

FIG. 17 is a schematic view of partial parameters according to the 1st embodiment of FIG. 1. In FIG. 17, when a sum of central thickness of the prism 140 of the at least one image-side reflective member of the image capturing optical lens assembly is ΣCTP, and an axial distance between the object-side surface 111 of the first lens element 110 and the image-side surface 132 of the third lens element 130 is TD, the following condition is satisfied: ΣCTP/TD=2.24.

In FIG. 17, when an axial distance between the first lens element 110 and the second lens element 120 is T12, an axial distance between the second lens element 120 and the third lens element 130 is T23, a central thickness of the first lens element 110 is CT1, a central thickness of the second lens element 120 is CT2, a central thickness of the third lens element 130 is CT3, a maximum among all axial distances between adjacent lens elements of the image capturing optical lens assembly is ATmax, a minimum among central thicknesses of all lens elements of the image capturing optical lens assembly is CTmin, an axial distance between the image-side surface 132 of the third lens element 130 and the image surface 160 is BL, and the axial distance between the object-side surface 111 of the first lens element 110 and the image-side surface 132 of the third lens element 130 is TD, the following conditions are satisfied: ATmax/CTmin=2.28; BL/TD=4.83; (CT1+CT2)/T12=64.54; (CT1+CT3)/CT2=4.94; (T12+T23)/(CT1+CT2+CT3)=0.40; and T23/T12=30.65. In the 1st embodiment, ATmax is a maximum between T12 and T23, CTmin is a minimum among CT1, CT2 and CT3, and ATmax=T23, CTmin=CT2.

In FIG. 17, when the axial distance between the object-side surface 111 of the first lens element 110 and the image-side surface 132 of the third lens element 130 is TD, an entrance pupil diameter of the image capturing optical lens assembly is EPD, and a maximum image height of the image capturing optical lens assembly is ImgH, the following conditions are satisfied: TD/EPD=0.73; and TD/ImgH=2.32.

In the image capturing optical lens assembly according to the 1st embodiment, when a curvature radius of the object-side surface 131 of the third lens element 130 is R5, and a curvature radius of the image-side surface 132 of the third lens element 130 is R6, the following condition is satisfied: |(R5+R6)/(R5−R6)|=27.34.

In the image capturing optical lens assembly according to the 1st embodiment, when the focal length of the image capturing optical lens assembly is f, a focal length of the first lens element 110 is f1, a focal length of the second lens element 120 is f2, a focal length of the third lens element 130 is f3, and the maximum image height of the image capturing optical lens assembly is ImgH, the following conditions are satisfied: |f/f1|+|f/f2|+|f/f3|=6.42; f/f1=3.22; f/f2=−2.96; f/f3=0.24; and f/ImgH=11.59.

In the image capturing optical lens assembly according to the 1st embodiment, when the focal length of the image capturing optical lens assembly is f, the curvature radius of the object-side surface 131 of the third lens element 130 is R5, the curvature radius of the image-side surface 132 of the third lens element 130 is R6, and the axial distance between the object-side surface 111 of the first lens element 110 and the image-side surface 132 of the third lens element 130 is TD, the following conditions are satisfied: f/R5=−3.84; f/R5+f/R6=−7.98; f/R6=−4.13; and f/TD=5.00.

In the image capturing optical lens assembly according to the 1st embodiment, when a composite focal length of the first lens element 110 and the second lens element 120 is f12, the focal length of the first lens element 110 is f1, the focal length of the second lens element 120 is f2, and the focal length of the third lens element 130 is f3, the following conditions are satisfied: f12/f3=0.29; and |f3/f1|+|f3/f2|=25.45.

In FIG. 17, when the maximum image height of the image capturing optical lens assembly is ImgH, a maximum distance between an optical effective area of the object-side surface 111 of the first lens element 110 and the optical axis is Y11, and a maximum distance between an optical effective area of the image-side surface 132 of the third lens element 130 and the optical axis is Y32, the following conditions are satisfied: ImgH/Y11=0.62; ImgH/Y32=0.78; and Y11/Y32=1.25.

The detailed optical data of the 1st embodiment are shown in Table 1 and the aspheric surface data are shown in Table 2 below.

Figure 18:
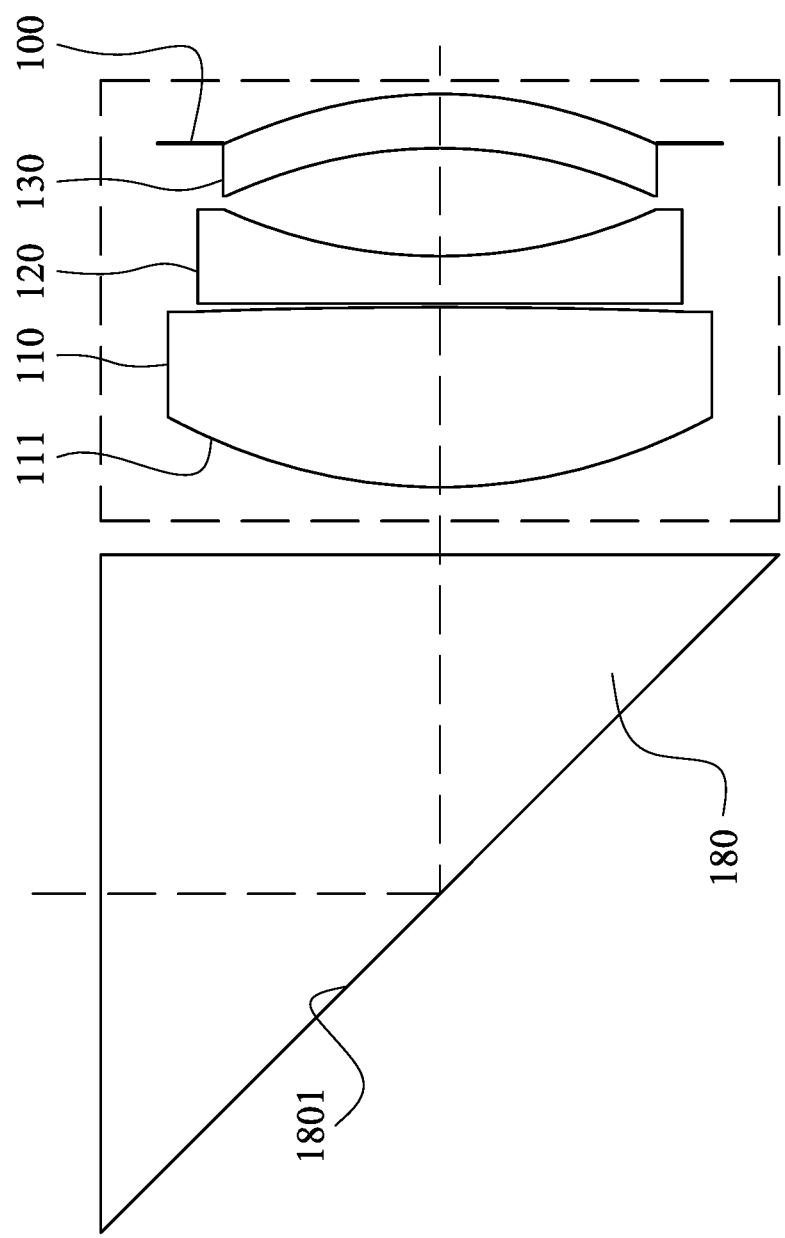
FIG. 18 is a schematic view of the image capturing optical lens assembly including an object-side reflective member according to the 1st embodiment of FIG. 1.
Figure 19:
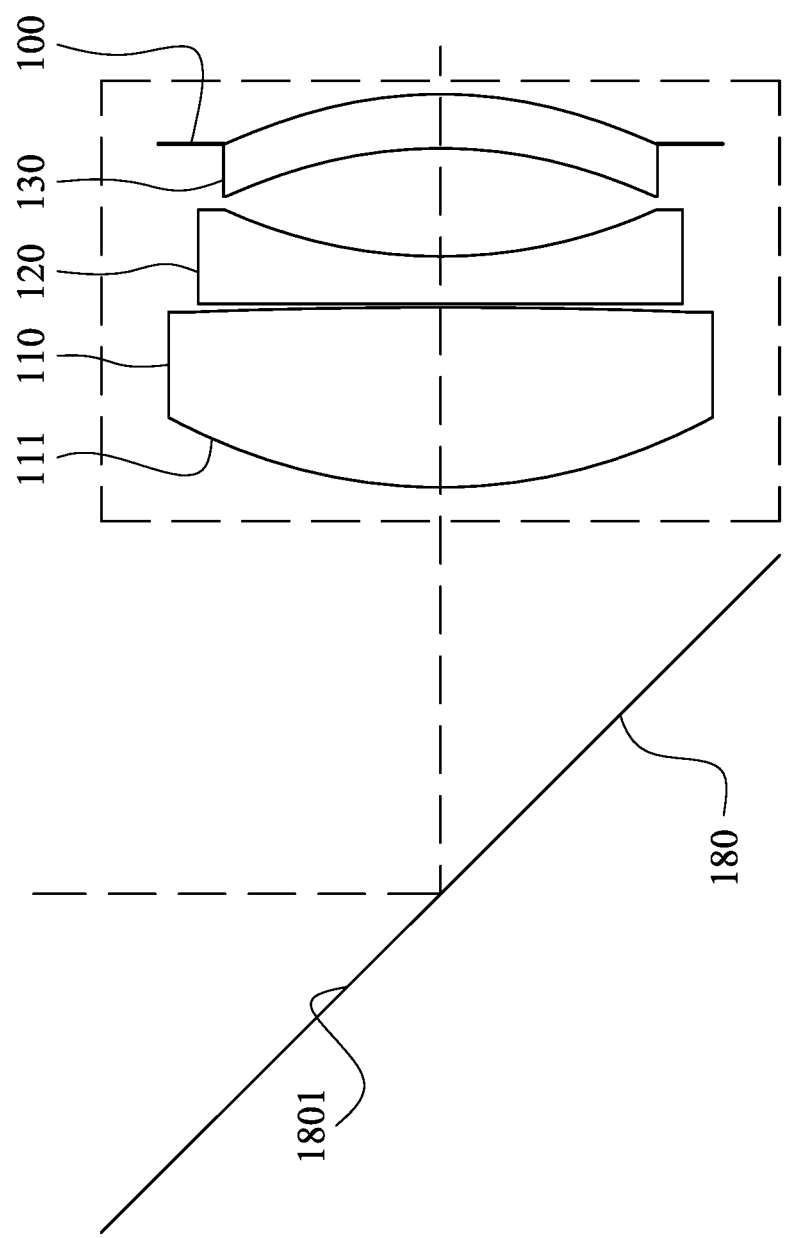
FIG. 19 is a schematic view of the image capturing optical lens assembly including another object-side reflective member according to the 1st embodiment of FIG. 1.
Figure 20:
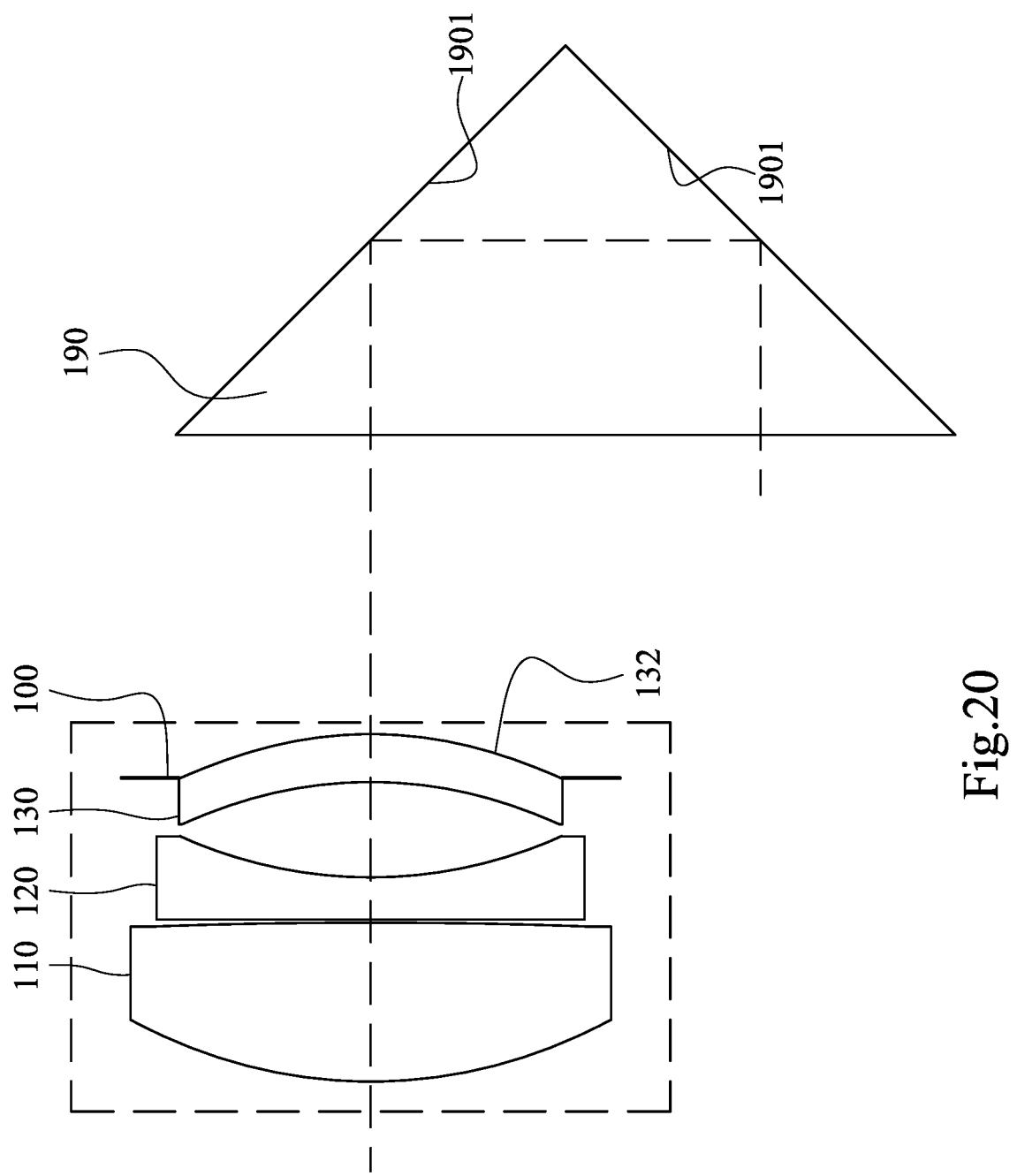
FIG. 20 is a schematic view of the image capturing optical lens assembly including an image-side reflective member according to the 1st embodiment of FIG. 1.
Figure 21:
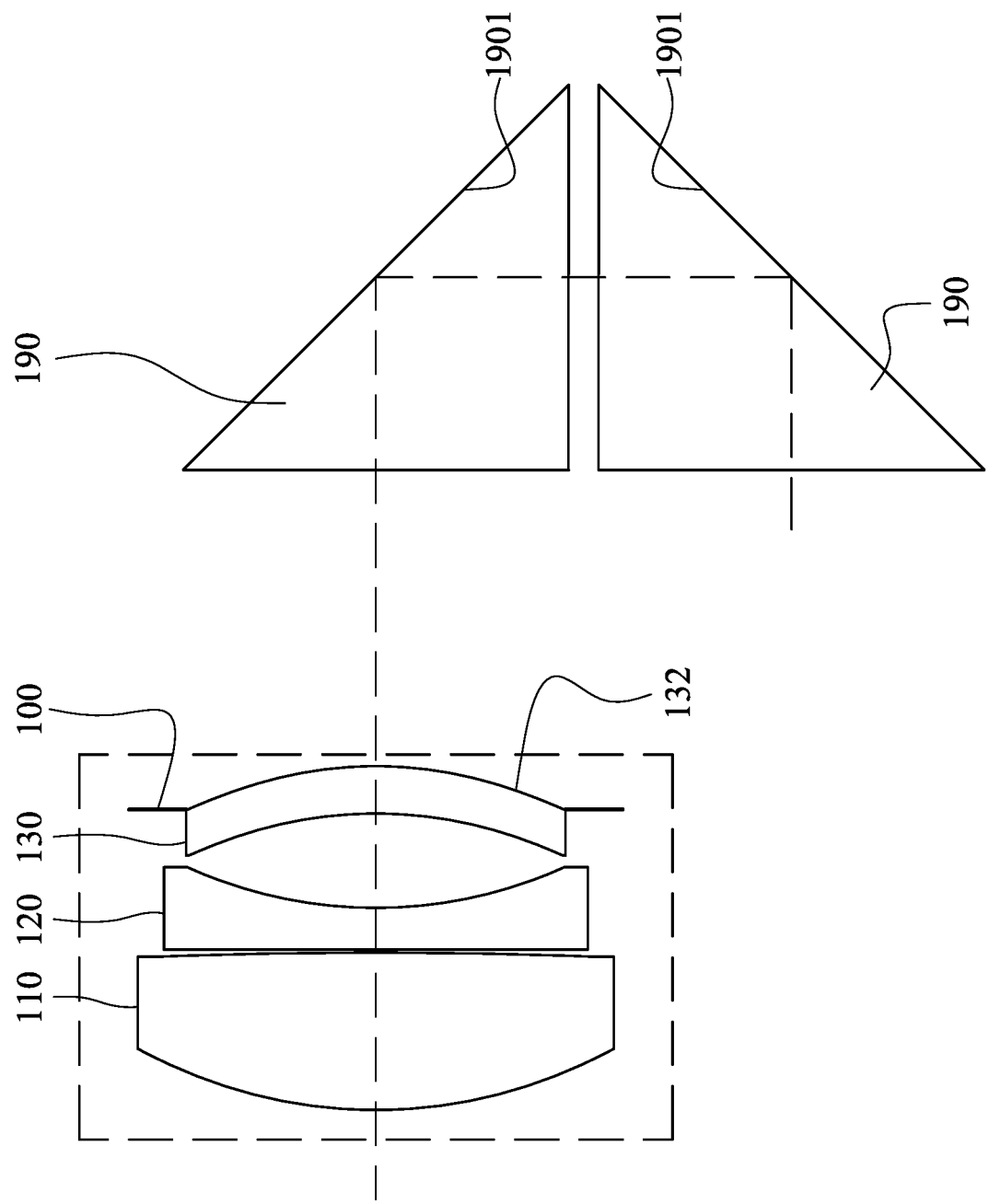
FIG. 21 is a schematic view of the image capturing optical lens assembly including another image-side reflective member according to the 1st embodiment of FIG. 1.
Figure 22:
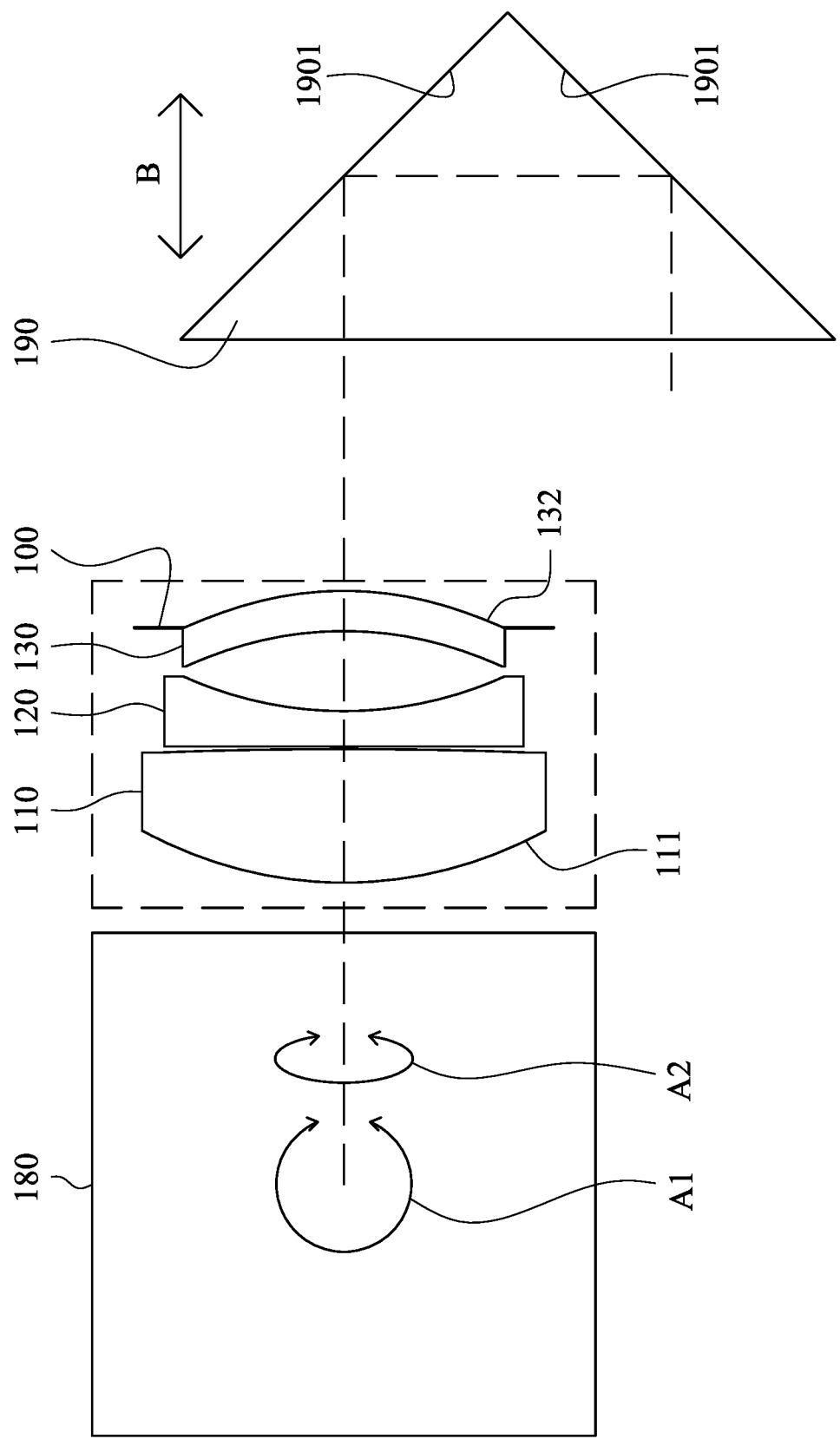
FIG. 22 is a schematic view of the image capturing optical lens assembly including an object-side reflective member and an image-side reflective member according to the 1st embodiment of FIG. 1.

FIG. 18 is a schematic view of the image capturing optical lens assembly including an object-side reflective member 180 according to the 1st embodiment of FIG. 1. FIG. 19 is a schematic view of the image capturing optical lens assembly including another object-side reflective member 180 according to the 1st embodiment of FIG. 1. FIG. 20 is a schematic view of the image capturing optical lens assembly including an image-side reflective member 190 according to the 1st embodiment of FIG. 1. FIG. 21 is a schematic view of the image capturing optical lens assembly including another image-side reflective member 190 according to the 1st embodiment of FIG. 1. FIG. 22 is a schematic view of the image capturing optical lens assembly including an object-side reflective member 180 and an image-side reflective member 190 according to the 1st embodiment of FIG.

TABLE 1

1st Embodiment
f = 29.02 mm, Fno = 3.63, HFOV = 4.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.223 | ASP | 2.656 | Glass | 1.853 | 39.0 | 9.01 |
| 2 | | −99.144 | ASP | 0.052 | | | | |
| 3 | Lens 2 | Plano | | 0.700 | Glass | 1.785 | 26.1 | −9.82 |
| 4 | | 7.703 | | 1.594 | | | | |
| 5 | Lens 3 | −7.552 | ASP | 0.800 | Plastic | 1.544 | 56.0 | 119.55 |
| 6 | | −7.019 | ASP | −0.731 | | | | |
| 7 | Ape. Stop | Plano | | 5.731 | | | | |
| 8 | Prism | Plano | | 13.007 | Glass | 1.772 | 49.6 | — |
| 9 | | Plano | | 1.000 | | | | |
| 10 | Filter | Plano | | 0.210 | Glass | 1.517 | 64.2 | — |
| 11 | | Plano | | 8.821 | | | | |
| 12 | Image | Plano | | — | | | | |

Reference wavelength is 587.6 nm (d-line)
Effective radius of Surface 1 is 4.010 mm

TABLE 2

Aspheric Coefficients

| Surface # | 1 | 2 | 5 | 6 |
|---|---|---|---|---|
| k = | 0.0000E+00 | 0.0000E+00 | 0.0000E+00 | 0.0000E+00 |
| A4 = | −5.5510E−05 | −1.3780E−04 | −1.4503E−03 | −7.2452E−04 |
| A6 = | 7.1576E−06 | 4.8443E−05 | 2.9848E−04 | 1.8693E−04 |
| A8 = | −2.4550E−07 | −4.3983E−06 | −2.5255E−05 | −1.0972E−05 |
| A10 = | −9.3650E−09 | 1.0842E−07 | −2.9913E−07 | −1.0198E−06 |
| A12 = | | | 2.0226E−07 | 2.2631E−07 |
| A14 = | | | −1.1263E−08 | −1.3224E−08 |
| A16 = | | | 2.3640E−10 | 3.0033E−10 |

Table 1 shows the detailed optical data of FIG. 1 of the 1st embodiment, wherein the curvature radius, thickness and the focal length are shown in millimeters (mm), Surface numbers 0-12 represent the surfaces sequentially arranged from the object side to the image side, and the refractive index is measured in accordance with the reference wavelength. Table 2 shows the aspheric surface data of the 1st embodiment, wherein k represents the conic coefficient of the equation of the aspheric surface profiles, and A4-A16 represent the aspheric coefficients of each surface ranging from the 4th order to the 16th order. The tables presented below for each embodiment correspond to the schematic view and aberration curves of each embodiment, and term definitions of the tables are the same as those in Table 1 and Table 2 of the 1st embodiment. Therefore, an explanation in this regard will not be provided again.

Figure 23:
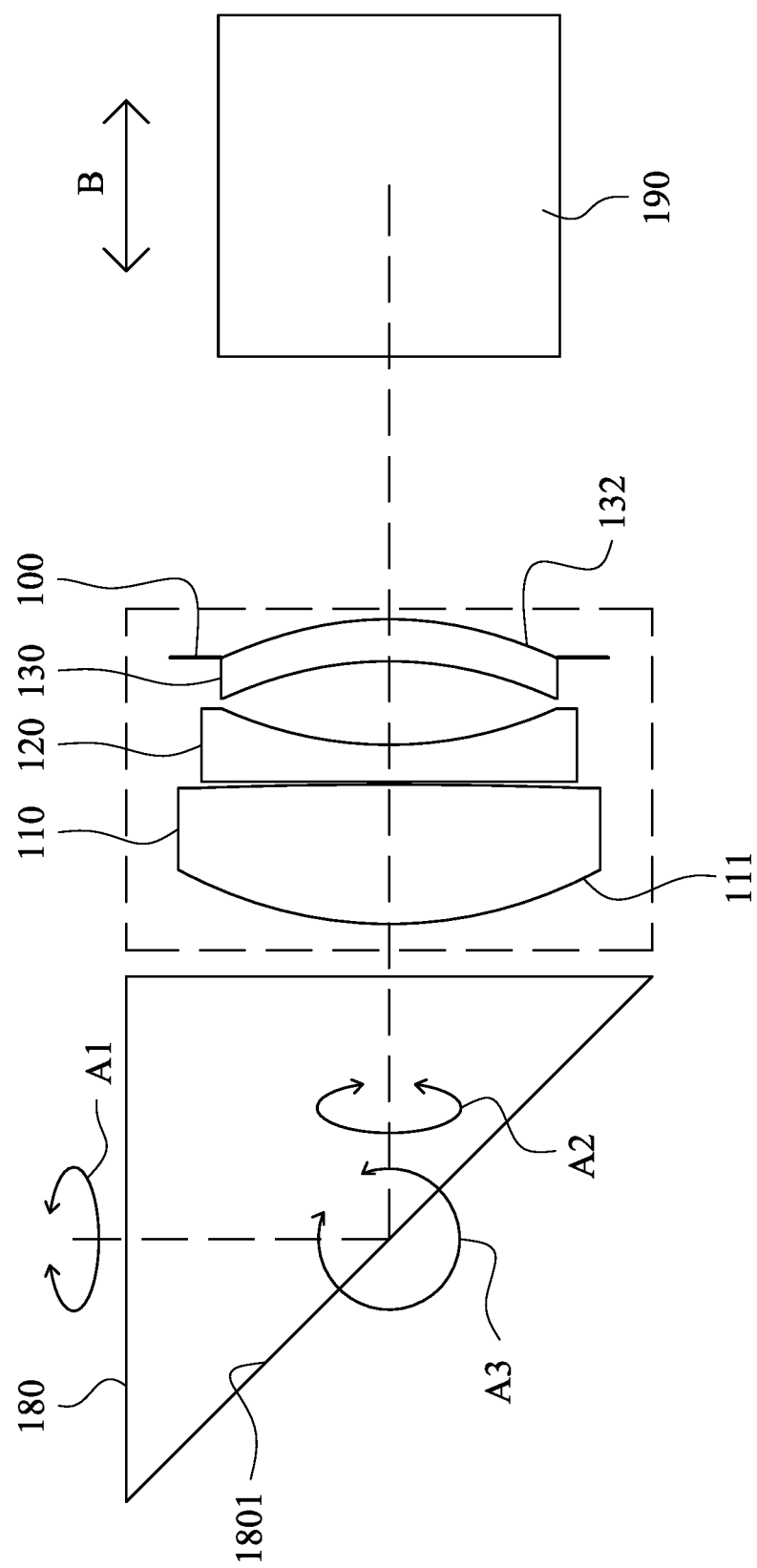
FIG. 23 is a schematic view from another view angle of the image capturing optical lens assembly of FIG. 22.

1. FIG. 23 is a schematic view from another view angle of the image capturing optical lens assembly of FIG. 22. In FIG. 18 to FIG. 23, a plurality of examples of the image capturing optical lens assembly including reflective member are disclosed, wherein the reflective member can be at least one of the object-side reflective member and the image-side reflective member, which can be a prism or a mirror, but is not limited to the present disclosure. In detail, in FIG. 18, the image capturing optical lens assembly can include the object-side reflective member 180, which is disposed at the object side of the object-side surface 111 of the first lens element 110, is a prism, and includes a reflective surface 1801. In FIG. 19, the image capturing optical lens assembly can include the object-side reflective member 180, which is disposed at the object side of the object-side surface 111 of the first lens element 110, is a mirror, and includes a reflective surface 1801. In FIG. 20, the image capturing optical lens assembly can include the image-side reflective member 190, which is disposed at the image side of the image-side surface 132 of the third lens element 130, is a prism, and includes two reflective surfaces 1901. In FIG. 21, the image capturing optical lens assembly can include two image-side reflective members 190, which are disposed at the image side of the image-side surface 132 of the third lens element 130, are both prisms, and respectively include a reflective surface 1901. In FIG. 22 and FIG. 23, the image capturing optical lens assembly can include an object-side reflective member 180 and an image-side reflective member 190. The object-side reflective member 180 is disposed at the object side of the object-side surface 111 of the first lens element 110, and the image-side reflective member 190 is disposed at the image side of the image-side surface 132 of the third lens element 130. The object-side reflective member 180 and the image-side reflective member 190 are both prisms. The object-side reflective member 180 includes a reflective surface 1801, and the image-side reflective member 190 includes two reflective surfaces 1901. In FIG. 22 and FIG. 23, the reflective surface of the object-side reflective member 180 can be driven and tilted by the driving apparatus and rotates around the three axes (i.e. along the A1, A2, A3 directions), so that it is favorable for instantly image tilt compensation and achieving the optical image stabilizing function. The image-side reflective member 190 can be driven by the driving apparatus to move in a parallel direction (i.e. along the direction B), and can achieve the auto-focusing function. The image-side reflective member 190 can move relative to the image sensor 170 in the focusing process.

It should be noted that, in FIG. 18 to FIG. 23, the simulation result can be the same as FIG. 1 if the folded light path is unfolded. In FIG. 20 to FIG. 23, the simulation result of any of the image-side reflective member 190 can be the same as the prism 140 of FIG. 1 if the folded light path is unfolded. Furthermore, all of the embodiments of the present disclosure can include the reflective member of FIG. 18 to FIG. 23, so an explanation in this regard will not be provided again.

Figure 24:
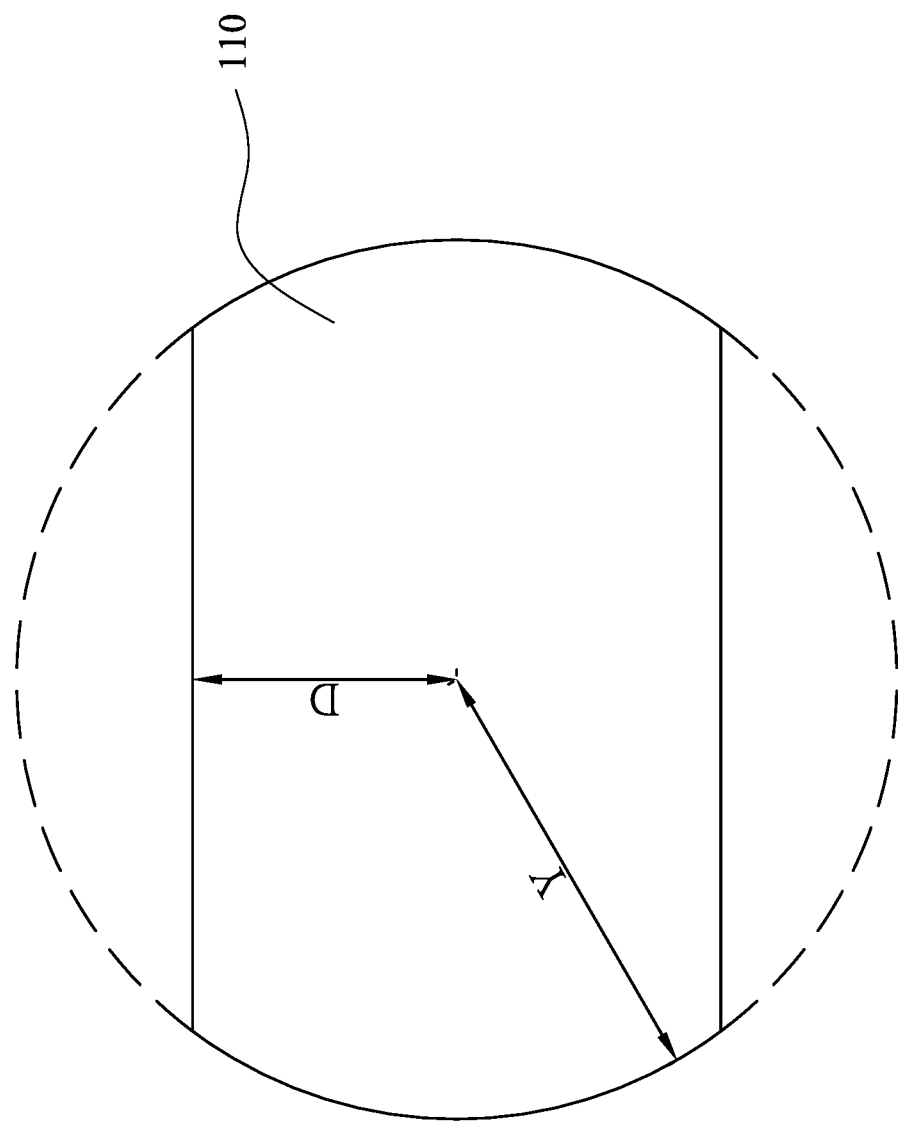
FIG. 24 is a schematic view of the object-side surface of the first lens element according to the 1st embodiment of FIG. 1.

FIG. 24 is a schematic view of the object-side surface 111 of the first lens element 110 according to the 1st embodiment of FIG. 1. In FIG. 24, the optical effective area of the first lens element 110 includes a non-circular shape, the non-circular shape has two arc sides and two straight sides, a radius of each arc side is Y, and a vertical distance between each straight side and the optical axis is D. In the 1st embodiment, all optical effective areas of the six surfaces, from the object-side surface 111 of the first lens element 110 to the image-side surface 132 of the third lens element 130, can be non-circular shapes, and can satisfy the following conditions: 1.1<Y/D<2.0 and 1.3<Y/D<1.8. Furthermore, the optical effective areas, from the object-side surface of the first lens element to the image-side surface of the third lens element, of all of the embodiments of the present disclosure can include the aforementioned non-circular shapes and satisfy the aforementioned conditions, so an explanation in this regard will not be provided again.

2nd Embodiment

Figure 3:
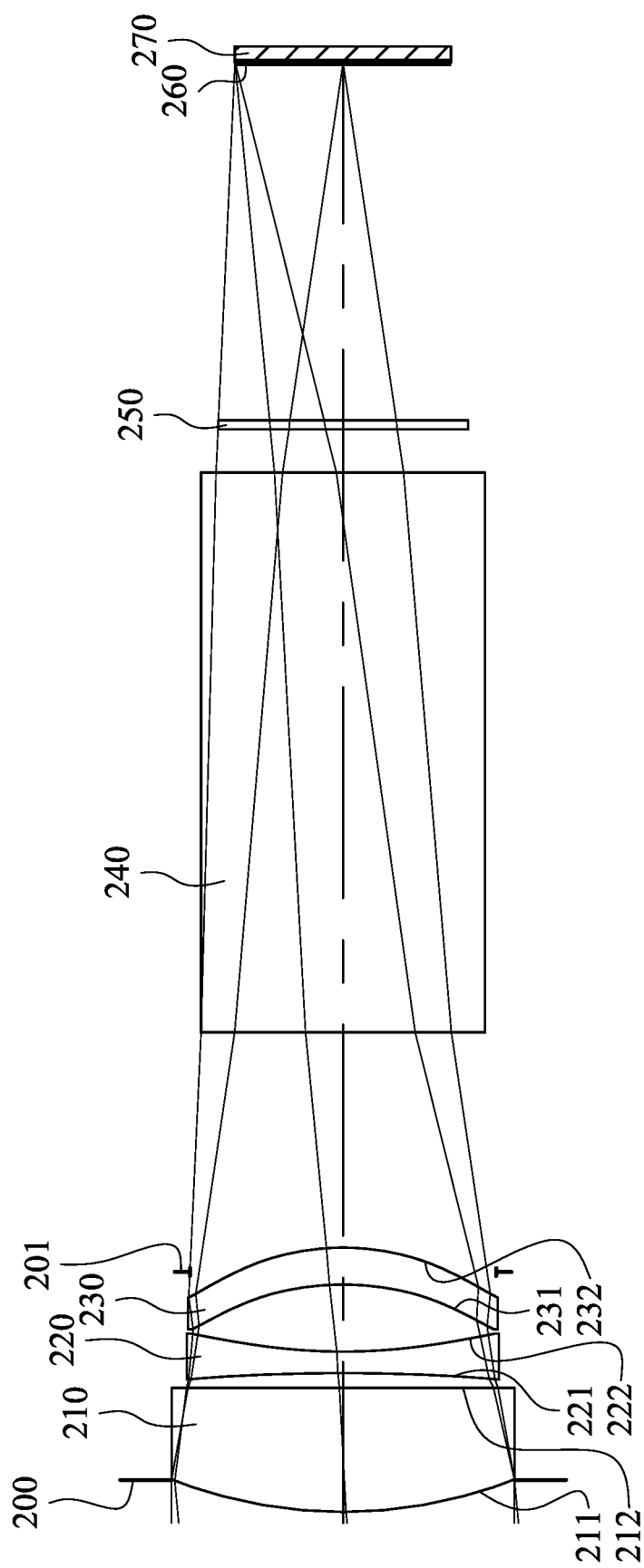
FIG. 3 is a schematic view of an imaging apparatus according to the 2nd embodiment of the present disclosure.
Figure 4:
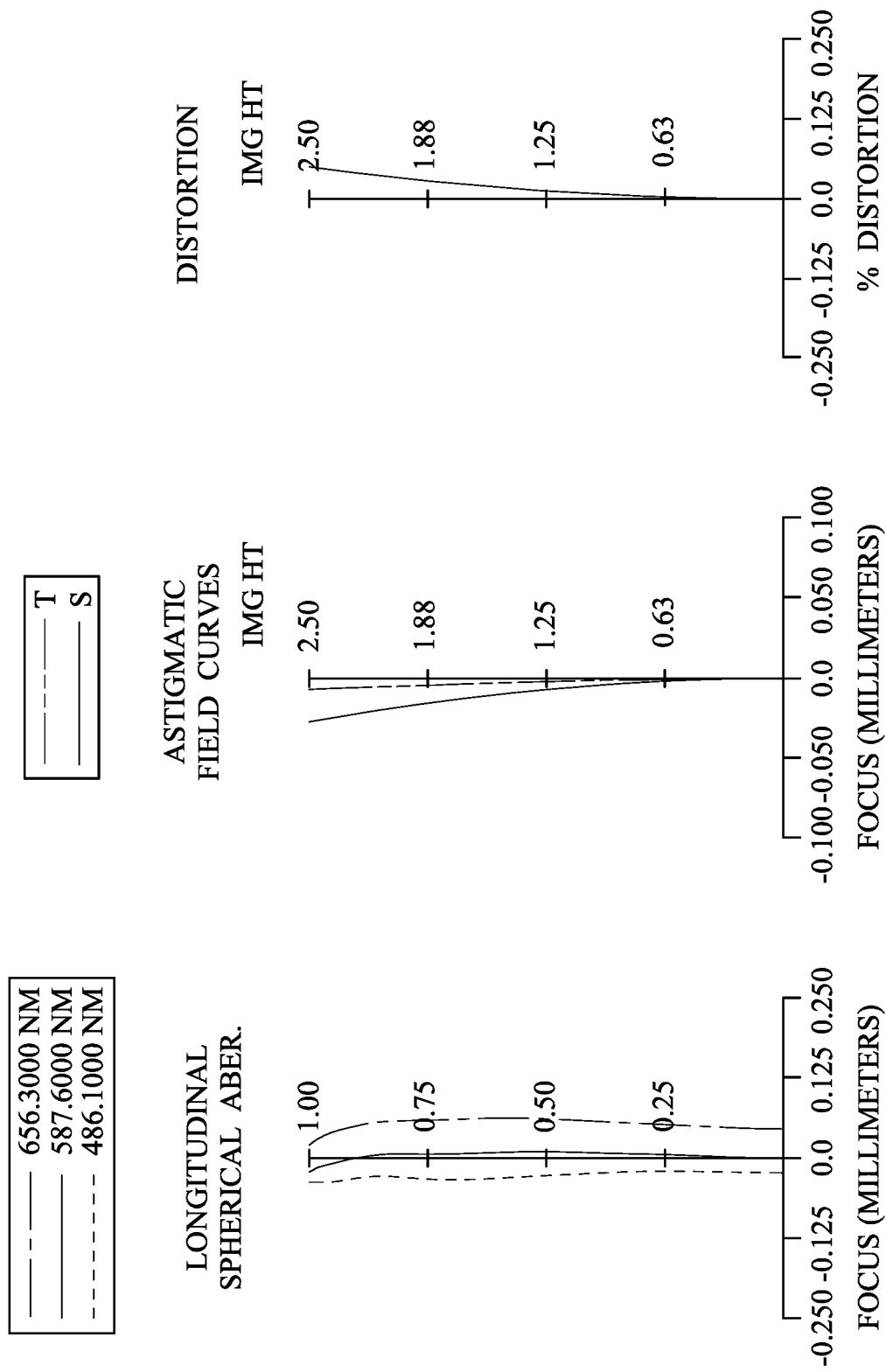
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows, in order from left to right, spherical aberration curves, astigmatic field curves and a distortion curve of the imaging apparatus of the 2nd embodiment. In FIG. 3, the imaging apparatus according to the 2nd embodiment includes an image capturing optical lens assembly (its reference number is omitted) and an image sensor 270. The image capturing optical lens assembly includes, in order from an object side to an image side along an optical path, an aperture stop 200, a first lens element 210, a second lens element 220, a third lens element 230, a stop 201, a prism 240, a filter 250 and an image surface 260, wherein the image sensor 270 is disposed on the image surface 260 of the image capturing optical lens assembly. The image capturing optical lens assembly includes three lens elements (210, 220, 230) without additional one or more lens elements inserted between the first lens element 210 and the third lens element 230.

The first lens element 210 with positive refractive power has an object-side surface 211 being convex in a paraxial region thereof and an image-side surface 212 being planar in a paraxial region thereof. The first lens element 210 is made of glass material.

The second lens element 220 with negative refractive power has an object-side surface 221 being concave in a paraxial region thereof and an image-side surface 222 being concave in a paraxial region thereof. The second lens element 220 is made of plastic material, and has the object-side surface 221 and the image-side surface 222 being both aspheric.

The third lens element 230 with positive refractive power has an object-side surface 231 being concave in a paraxial region thereof and an image-side surface 232 being convex in a paraxial region thereof. The third lens element 230 is made of plastic material, and has the object-side surface 231 and the image-side surface 232 being both aspheric.

The prism 240 is made of glass material and disposed at an image side of the third lens element 230. The prism 240 can be taken as the image-side reflective member of the image capturing optical lens assembly.

The filter 250 is made of glass material and disposed between the prism 240 and the image surface 260 and will not affect a focal length of the image capturing optical lens assembly.

The detailed optical data of the 2nd embodiment are shown in Table 3 and the aspheric surface data are shown in Table 4 below.

TABLE 3

2nd Embodiment
f = 27.06 mm, Fno = 3.40, HFOV = 5.3 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.749 | | | | |
| 2 | Lens 1 | 10.793 | | 2.886 | Glass | 1.850 | 32.3 | 12.69 |
| 3 | | Plano | | 0.345 | | | | |
| 4 | Lens 2 | −43.535 | ASP | 0.500 | Plastic | 1.669 | 19.5 | −15.60 |

TABLE 3-continued

2nd Embodiment
f = 27.06 mm, Fno = 3.40, HFOV = 5.3 deg.

| Surface# | | Curvature Radius | Thickness | | Material | Index | Abbe # | Focal Length |
|---|---|---|---|---|---|---|---|---|
| 5 | | 13.794 | ASP | 1.554 | | | | |
| 6 | Lens 3 | −6.660 | ASP | 0.859 | Plastic | 1.544 | 56.0 | 61.62 |
| 7 | | −5.809 | ASP | −0.566 | | | | |
| 8 | Stop | Plano | | 5.566 | | | | |
| 9 | Prism | Plano | | 13.007 | Glass | 1.729 | 54.7 | — |
| 10 | | Plano | | 1.000 | | | | |
| 11 | Filter | Plano | | 0.210 | Glass | 1.517 | 64.2 | — |
| 12 | | Plano | | 8.314 | | | | |
| 13 | Image | Plano | | — | | | | |

Reference wavelength is 587.6 nm (d-line)
Effective radius of Surface 8 (Stop 201) is 3.550 mm

TABLE 4

Aspheric Coefficients

| Surface # | 4 | 5 | 6 | 7 |
|---|---|---|---|---|
| k = | 0.0000E+00 | 0.0000E+00 | 0.0000E+00 | 0.0000E+00 |
| A4 = | 6.5186E−05 | −1.1384E−04 | −1.2073E−03 | −4.4688E−04 |
| A6 = | −2.8624E−05 | −6.3809E−05 | −5.7425E−05 | −1.0446E−05 |
| A8 = | 1.4389E−05 | 2.2786E−05 | 1.0022E−05 | 3.1241E−06 |
| A10 = | −2.1419E−06 | −2.5968E−06 | 3.5430E−06 | 2.0311E−06 |
| A12 = | 1.2771E−07 | 1.0293E−07 | −7.2233E−07 | −3.4905E−07 |
| A14 = | −2.8800E−09 | −1.2333E−09 | 4.9945E−08 | 2.2514E−08 |
| A16 = | | | −1.1579E−09 | −4.7601E−10 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 27.06 | TD/ImgH | 2.45 |
| Fno | 3.40 | |(R5 + R6)/(R5 − R6)| | 14.65 |
| HFOV [deg.] | 5.3 | |f/f1| + |f/f2| + |f/f3| | 4.31 |
| N1 + N2 | 3.519 | f/f1 | 2.13 |
| (N1 + N2)/N3 | 2.28 | f/f2 | −1.73 |
| N3 | 1.544 | f/f3 | 0.44 |
| V2 | 19.5 | f/ImgH | 10.81 |
| Vmin | 19.5 | f/R5 | −4.06 |
| ΣCTP/TD | 2.12 | f/R5 + f/R6 | −8.72 |
| ATmax/CTmin | 3.11 | f/R6 | −4.66 |
| BL/TD | 4.48 | f/TD | 4.40 |
| (CT1 + CT2)/T12 | 9.81 | f12/f3 | 0.64 |
| (CT1 + CT3)/CT2 | 7.49 | |f3/f1| + |f3/f2| | 8.80 |
| (T12 + T23)/(CT1 + CT2 + CT3) | 0.45 | ImgH/Y11 | 0.63 |
| T23/T12 | 4.50 | ImgH/Y32 | 0.70 |
| TD/EPD | 0.77 | Y11/Y32 | 1.11 |

3rd Embodiment

Figure 5:
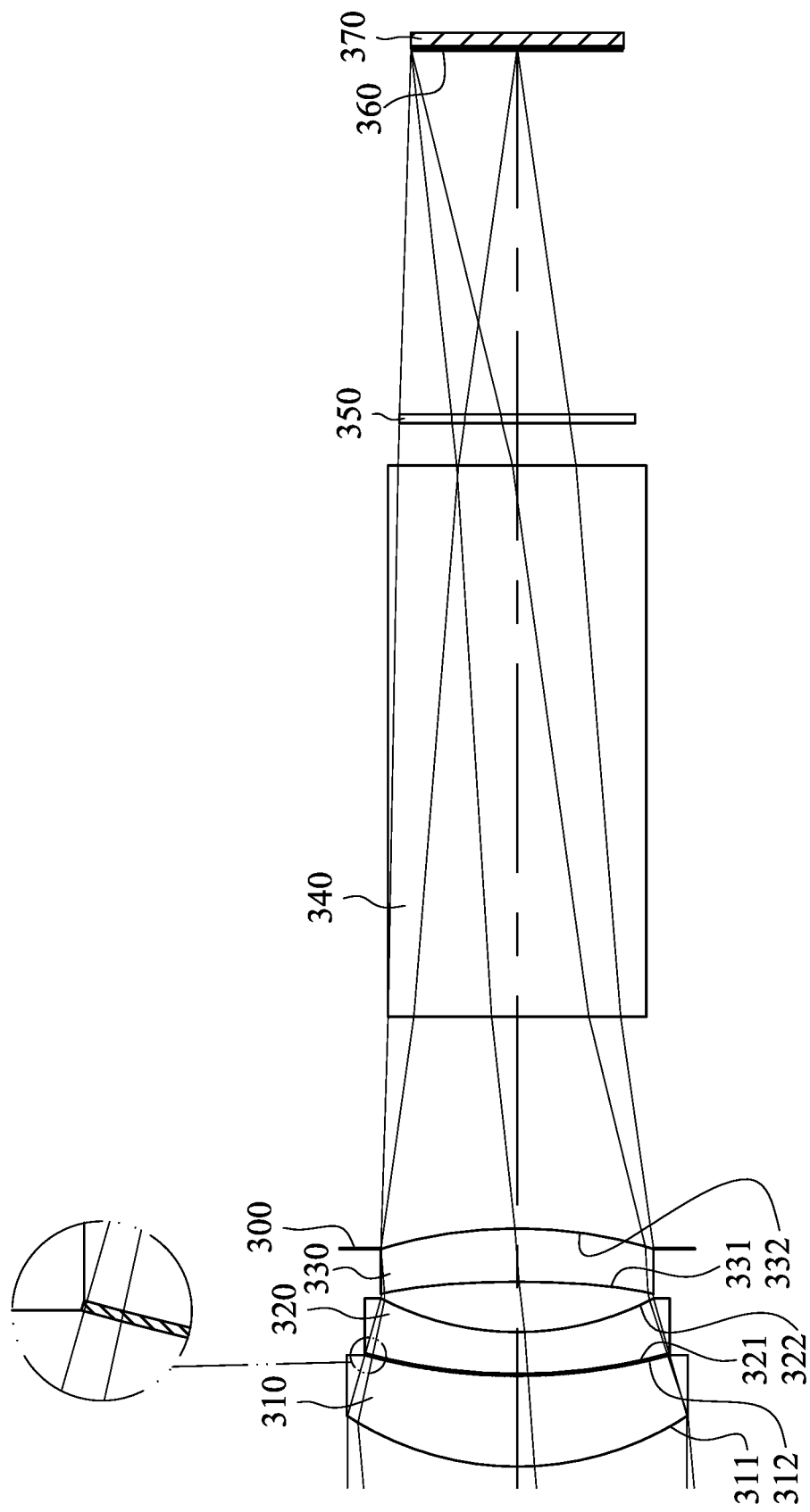
FIG. 5 is a schematic view of an imaging apparatus according to the 3rd embodiment of the present disclosure.
Figure 6:
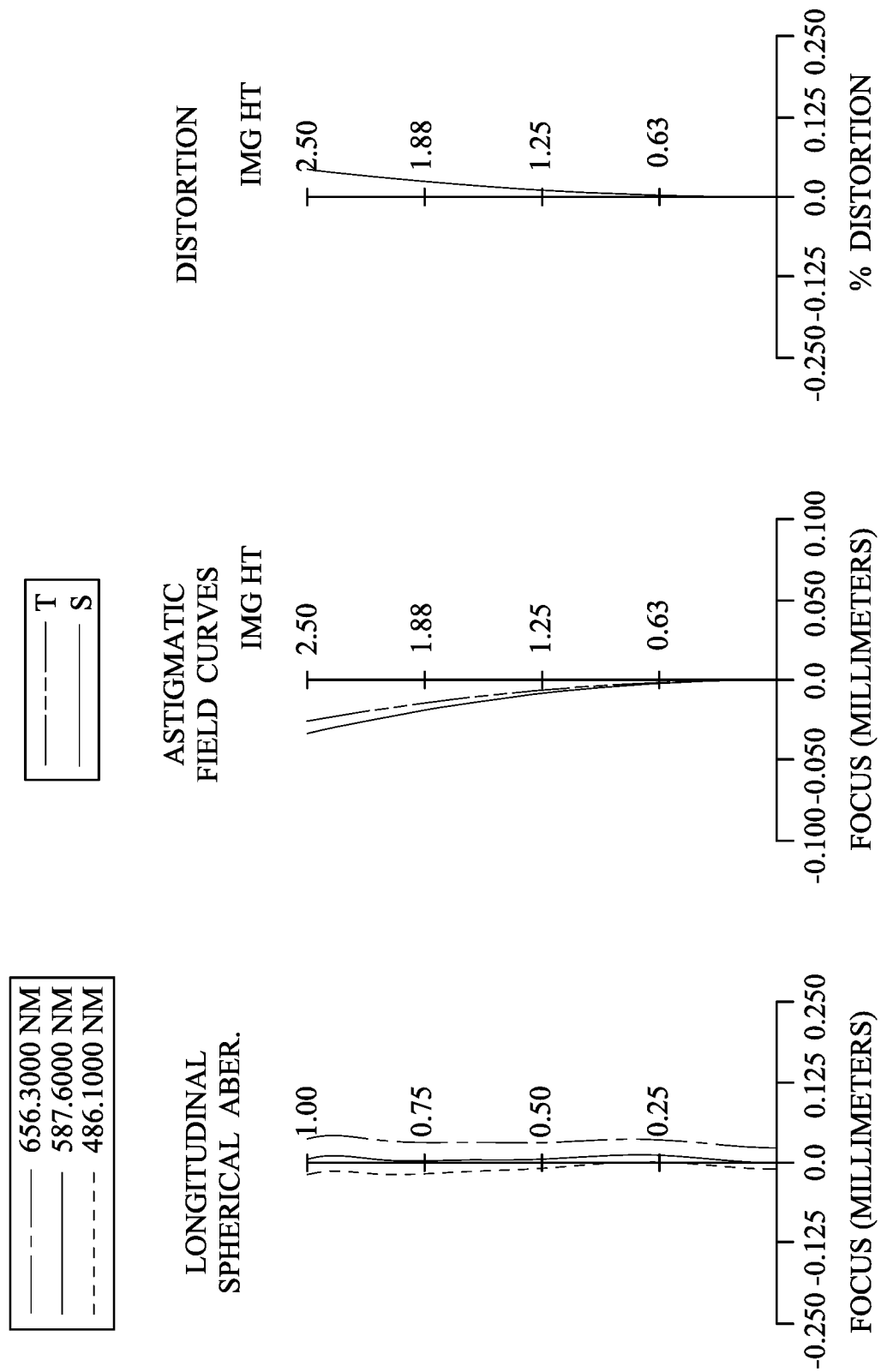
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows, in order from left to right, spherical aberration curves, astigmatic field curves and a distortion curve of the imaging apparatus of the 3rd embodiment. In FIG. 5, the imaging apparatus according to the 3rd embodiment includes an image capturing optical lens assembly (its reference number is omitted) and an image sensor 370. The image capturing optical lens assembly includes, in order from an object side to an image side along an optical path, a first lens element 310, a second lens element 320, a third lens element 330, an aperture stop 300, a prism 340, a filter 350 and an image surface 360, wherein the image sensor 370 is disposed on the image surface 360 of the image capturing optical lens assembly. The image capturing optical lens assembly includes three lens elements (310, 320, 330) without additional one or more lens elements inserted between the first lens element 310 and the third lens element 330.

The first lens element 310 with positive refractive power has an object-side surface 311 being convex in a paraxial region thereof and an image-side surface 312 being concave in a paraxial region thereof. The first lens element 310 is made of glass material.

The second lens element 320 with negative refractive power has an object-side surface 321 being convex in a paraxial region thereof and an image-side surface 322 being concave in a paraxial region thereof. The second lens element 320 is made of glass material. The object-side surface 321 of the second lens element 320 is cemented with the image-side surface 312 of the first lens element 310 to form a cemented lens element.

The third lens element 330 with positive refractive power has an object-side surface 331 being concave in a paraxial region thereof and an image-side surface 332 being convex in a paraxial region thereof. The third lens element 330 is made of glass material, and has the object-side surface 331 and the image-side surface 332 being both aspheric.

The prism 340 is made of glass material and disposed at an image side of the third lens element 330. The prism 340 can be taken as the image-side reflective member of the image capturing optical lens assembly.

The filter 350 is made of glass material and disposed between the prism 340 and the image surface 360 and will not affect a focal length of the image capturing optical lens assembly.

The detailed optical data of the 3rd embodiment are shown in Table 5 and the aspheric surface data are shown in Table 6 below.

TABLE 5

3rd Embodiment
f = 28.51 mm, Fno = 3.56, HFOV = 5.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.299 | | 2.140 | Glass | 1.835 | 42.7 | 16.51 |
| 2 | | 13.445 | | 0.050 | Cement | 1.485 | 53.2 | — |
| 3 | Lens 2 | 13.445 | | 0.984 | Glass | 1.847 | 23.8 | −17.87 |
| 4 | | 6.881 | | 1.188 | | | | |
| 5. | Lens 3 | −29.775 | ASP | 1.256 | Glass | 1.497 | 81.3 | 40.59 |
| 6 | | −12.194 | ASP | −0.471 | | | | |
| 7 | Ape. Stop | Plano | | 5.471 | | | | |
| 8 | Prism | Plano | | 13.007 | Glass | 1.741 | 52.7 | — |
| 9 | | Plano | | 1.000 | | | | |
| 10 | Filter | Plano | | 0.210 | Glass | 1.517 | 64.2 | — |
| 11 | | Plano | | 8.634 | | | | |
| 12 | Image | Plano | | — | | | | |

Reference wavelength is 587.6 nm (d-line)
Effective radius of Surface 1 is 4.020 mm

TABLE 6

Aspheric Coefficients

| Surface # | 5 | 6 |
|---|---|---|
| k = | 0.0000E+00 | 0.0000E+00 |
| A4 = | −1.2064E−03 | −6.9143E−04 |
| A6 = | −1.8962E−06 | −2.1176E−05 |
| A8 = | 4.6904E−06 | 1.3651E−05 |
| A10 = | −9.7443E−07 | −2.6511E−06 |
| A12 = | 1.4688E−07 | 3.1621E−07 |
| A14 = | −1.0620E−08 | −1.9557E−08 |
| A16 = | 3.0104E−10 | 4.9278E−10 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 28.51 | TD/ImgH | 2.24 |
| Fno | 3.56 | |(R5 + R6)/(R5 − R6)| | 2.39 |
| HFOV [deg.] | 5.0 | |f/f1| + |f/f2| + |f/f3| | 4.02 |
| N1 + N2 | 3.681 | f/f1 | 1.73 |
| (N1 + N2)/N3 | 2.46 | f/f2 | −1.59 |
| N3 | 1.497 | f/f3 | 0.70 |
| V2 | 23.8 | f/ImgH | 11.39 |
| Vmin | 23.8 | f/R5 | −0.96 |
| ΣCTP/TD | 2.32 | f/R5 + f/R6 | −3.30 |
| ATmax/CTmin | 1.21 | f/R6 | −2.34 |
| BL/TD | 4.96 | f/TD | 5.07 |
| (CT1 + CT2)/T12 | 62.48 | f12/f3 | 1.51 |
| (CT1 + CT3)/CT2 | 3.45 | |f3/f1| + |f3/f2| | 4.73 |
| (T12 + T23)/(CT1 + CT2 + CT3) | 0.28 | ImgH/Y11 | 0.62 |
| T23/T12 | 23.76 | ImgH/Y32 | 0.78 |
| TD/EPD | 0.70 | Y11/Y32 | 1.25 |

4th Embodiment

Figure 7:
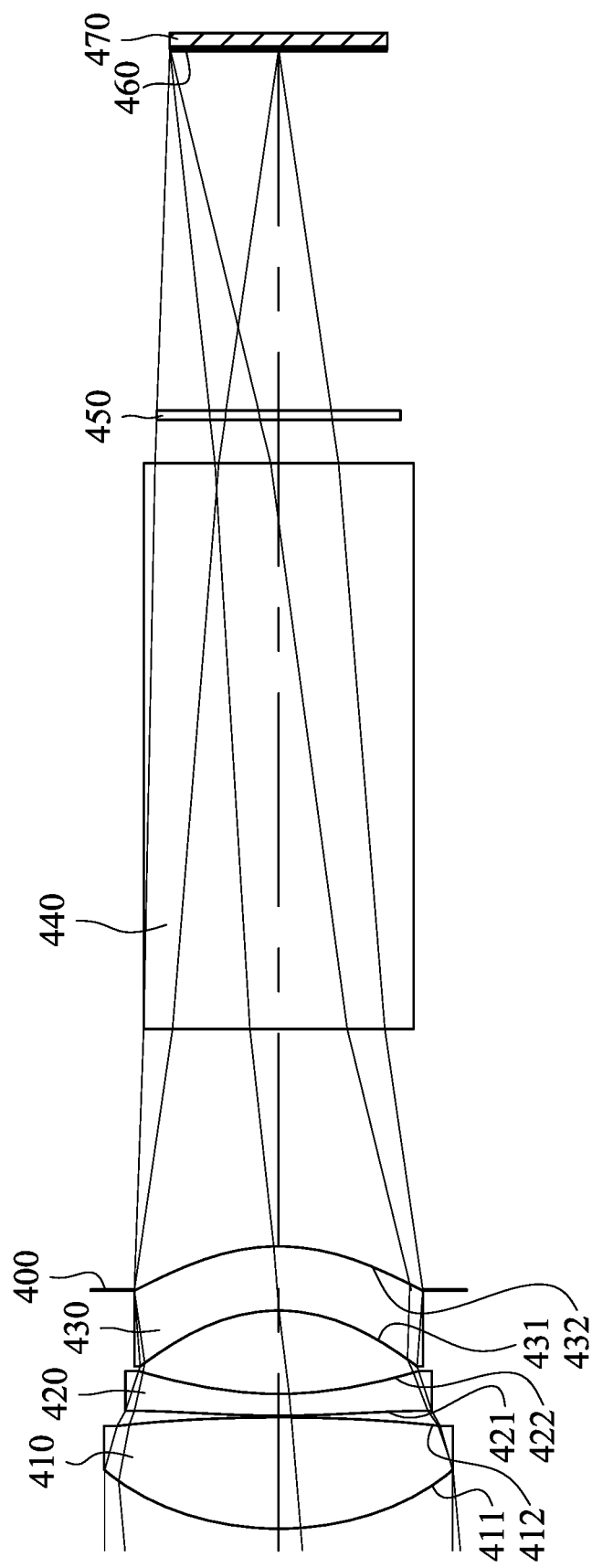
FIG. 7 is a schematic view of an imaging apparatus according to the 4th embodiment of the present disclosure.
Figure 8:
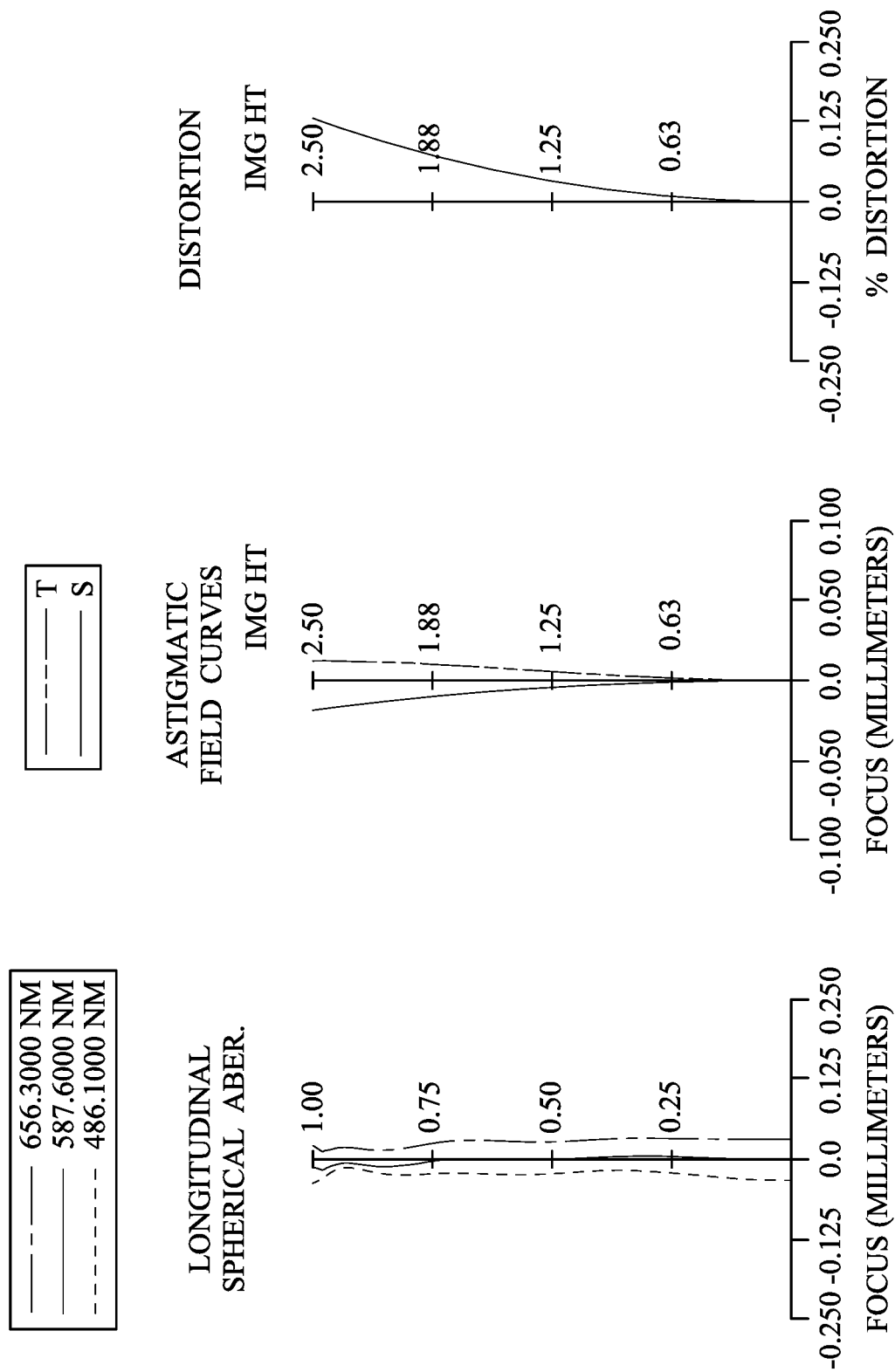
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows, in order from left to right, spherical aberration curves, astigmatic field curves and a distortion curve of the imaging apparatus of the 4th embodiment. In FIG. 7, the imaging apparatus according to the 4th embodiment includes an image capturing optical lens assembly (its reference number is omitted) and an image sensor 470. The image capturing optical lens assembly includes, in order from an object side to an image side along an optical path, a first lens element 410, a second lens element 420, a third lens element 430, an aperture stop 400, a prism 440, a filter 450 and an image surface 460, wherein the image sensor 470 is disposed on the image surface 460 of the image capturing optical lens assembly. The image capturing optical lens assembly includes three lens elements (410, 420, 430) without additional one or more lens elements inserted between the first lens element 410 and the third lens element 430.

The first lens element 410 with positive refractive power has an object-side surface 411 being convex in a paraxial region thereof and an image-side surface 412 being convex in a paraxial region thereof. The first lens element 410 is made of plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material, and has the object-side surface 421 and the image-side surface 422 being both aspheric.

The third lens element 430 with negative refractive power has an object-side surface 431 being concave in a paraxial region thereof and an image-side surface 432 being convex in a paraxial region thereof. The third lens element 430 is made of plastic material, and has the object-side surface 431 and the image-side surface 432 being both aspheric.

The prism 440 is made of glass material and disposed at an image side of the third lens element 430. The prism 440 can be taken as the image-side reflective member of the image capturing optical lens assembly.

The filter 450 is made of glass material and disposed between the prism 440 and the image surface 460 and will not affect a focal length of the image capturing optical lens assembly.

The detailed optical data of the 4th embodiment are shown in Table 7 and the aspheric surface data are shown in Table 8 below.

Moreover, these parameters can be calculated from Table 7 and Table 8 as the following values and satisfy the following conditions:

| 4th Embodiment | | | |
|---|---|---|---|
| f [mm] | 27.73 | TD/ImgH | 2.59 |
| Fno | 3.47 | |(R5 + R6)/(R5 − R6)| | 8.65 |
| HFOV [deg.] | 5.2 | |f/f1| + |f/f2| + |f/f3| | 3.98 |
| N1 + N2 | 3.158 | f/f1 | 2.41 |
| (N1 + N2)/N3 | 2.05 | f/f2 | −1.17 |
| N3 | 1.544 | f/f3 | −0.39 |
| V2 | 26.0 | f/ImgH | 11.08 |
| Vmin | 26.0 | f/R5 | −7.16 |
| ΣCTP/TD | 2.00 | f/R5 + f/R6 | −12.83 |
| ATmax/CTmin | 3.83 | f/R6 | −5.67 |
| BL/TD | 4.24 | f/TD | 4.27 |
| (CT1 + CT2)/T12 | 76.50 | f12/f3 | −0.27 |
| (CT1 + CT3)/CT2 | 8.07 | |f3/f1| + |f3/f2| | 9.12 |
| (T12 + T23)/(CT1 + CT2 + CT3) | 0.43 | ImgH/Y11 | 0.62 |
| T23/T12 | 47.88 | ImgH/Y32 | 0.75 |
| TD/EPD | 0.81 | Y11/Y32 | 1.21 |

TABLE 7

4th Embodiment
f = 27.73 mm, Fno = 3.47, HFOV = 5.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.117 | ASP | 2.560 | Plastic | 1.544 | 56.0 | 11.49 |
| 2 | | −44.791 | ASP | 0.040 | | | | |
| 3 | Lens 2 | 26.737 | ASP | 0.500 | Plastic | 1.614 | 26.0 | −23.66 |
| 4 | | 9.343 | ASP | 1.915 | | | | |
| 5 | Lens 3 | −3.873 | ASP | 1.475 | Plastic | 1.544 | 56.0 | −70.55 |
| 6 | | −4.886 | ASP | −1.006 | | | | |
| 7 | Ape. Stop | Plano | | 6.006 | | | | |
| 8 | Prism | Plano | | 13.007 | Glass | 1.772 | 49.6 | — |
| 9 | | Plano | | 1.000 | | | | |
| 10 | Filter | Plano | | 0.210 | Glass | 1.517 | 64.2 | — |
| 11 | | Plano | | 8.315 | | | | |
| 12 | Image | Plano | | — | | | | |

Reference wavelength is 587.6 nm (d-line)
Effective radius of Surface 1 is 4.010 mm

TABLE 8

Aspheric Coefficients

| Surface # | 1 | 2 | 3 | 4 | 5 | 6 |
|---|---|---|---|---|---|---|
| k = | 0.0000E+00 | 0.0000E+00 | 0.0000E+00 | 0.0000E+00 | 0.0000E+00 | 0.0000E+00 |
| A4 = | 3.9604E−05 | −1.1807E−03 | −1.1712E−04 | 1.0155E−03 | 1.7034E−03 | 1.3345E−03 |
| A6 = | 2.6737E−05 | 2.2100E−04 | −2.8308E−04 | −5.3296E−04 | −1.6263E−04 | −9.0469E−05 |
| A8 = | −3.0980E−07 | −1.7842E−05 | 5.8208E−05 | 8.3258E−05 | 1.3914E−04 | 6.6723E−05 |
| A10 = | 1.9227E−08 | 4.9498E−07 | −5.8074E−06 | −5.2202E−06 | −2.5180E−05 | −1.1337E−05 |
| A12 = | | | 2.4026E−07 | −3.1198E−08 | 2.4279E−06 | 1.0173E−06 |
| A14 = | | | −2.4558E−09 | 1.0772E−08 | −1.1800E−07 | −4.5208E−08 |
| A16 = | | | | | 2.3987E−09 | 7.8583E−10 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

5th Embodiment

Figure 9:
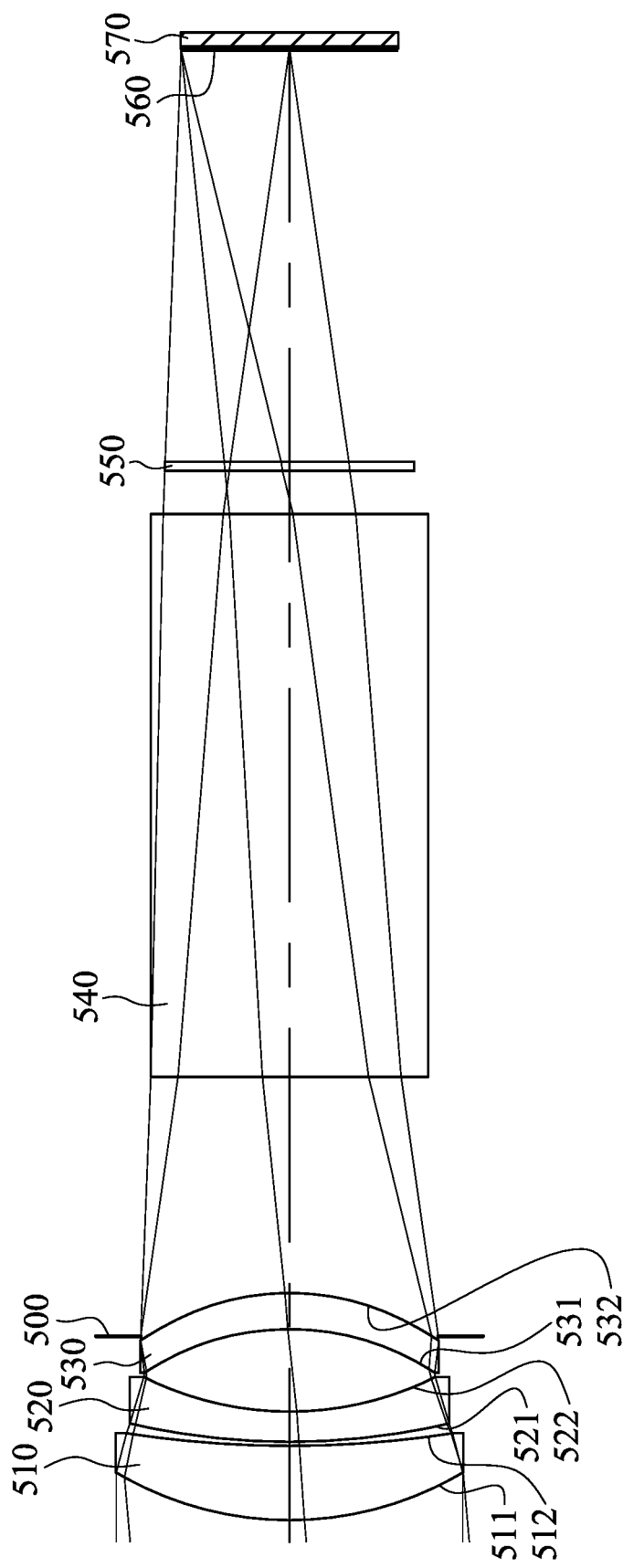
FIG. 9 is a schematic view of an imaging apparatus according to the 5th embodiment of the present disclosure.
Figure 10:
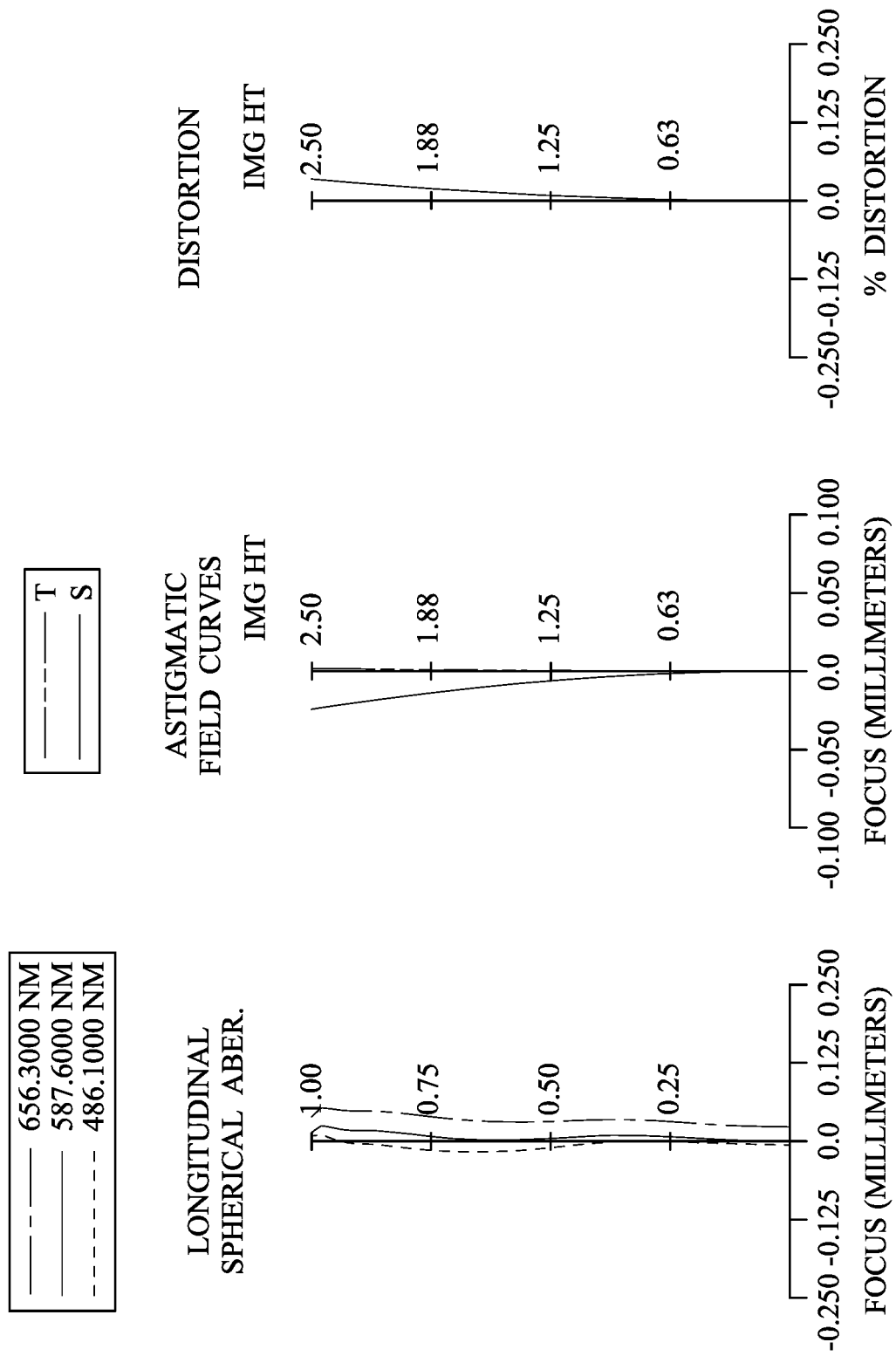
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows, in order from left to right, spherical aberration curves, astigmatic field curves and a distortion curve of the imaging apparatus of the 5th embodiment. In FIG. 9, the imaging apparatus according to the 5th embodiment includes an image capturing optical lens assembly (its reference number is omitted) and an image sensor 570. The image capturing optical lens assembly includes, in order from an object side to an image side along an optical path, a first lens element 510, a second lens element 520, a third lens element 530, an aperture stop 500, a prism 540, a filter 550 and an image surface 560, wherein the image sensor 570 is disposed on the image surface 560 of the image capturing optical lens assembly. The image capturing optical lens assembly includes three lens elements (510, 520, 530) without additional one or more lens elements inserted between the first lens element 510 and the third lens element 530.

The first lens element 510 with positive refractive power has an object-side surface 511 being convex in a paraxial region thereof and an image-side surface 512 being concave in a paraxial region thereof. The first lens element 510 is made of glass material.

The second lens element 520 with negative refractive power has an object-side surface 521 being convex in a paraxial region thereof and an image-side surface 522 being concave in a paraxial region thereof. The second lens element 520 is made of glass material.

The third lens element 530 with positive refractive power has an object-side surface 531 being concave in a paraxial region thereof and an image-side surface 532 being convex in a paraxial region thereof. The third lens element 530 is made of plastic material, and has the object-side surface 531 and the image-side surface 532 being both aspheric.

The prism 540 is made of glass material and disposed at an image side of the third lens element 530. The prism 540 can be taken as the image-side reflective member of the image capturing optical lens assembly.

The filter 550 is made of glass material and disposed between the prism 540 and the image surface 560 and will not affect a focal length of the image capturing optical lens assembly.

The detailed optical data of the 5th embodiment are shown in Table 9 and the aspheric surface data are shown in Table 10 below.

TABLE 9

5th Embodiment
f = 28.19 mm, Fno = 3.52, HFOV = 5.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.823 | | 1.718 | Glass | 1.835 | 42.7 | 13.19 |
| 2 | | 24.292 | | 0.093 | | | | |
| 3 | Lens 2 | 16.164 | | 0.700 | Glass | 1.847 | 23.8 | −17.09 |
| 4 | | 7.483 | | 1.901 | | | | |
| 5 | Lens 3 | −6.600 | ASP | 0.839 | Plastic | 1.545 | 56.1 | 79.49 |
| 6 | | −5.984 | ASP | −1.000 | | | | |
| 7 | Ape. Stop | Plano | | 6.000 | | | | |
| 8 | Prism | Plano | | 13.007 | Glass | 1.772 | 49.6 | — |
| 9 | | Plano | | 1.000 | | | | |
| 10 | Filter | Plano | | 0.210 | Glass | 1.517 | 64.2 | — |
| 11 | | Plano | | 9.559 | | | | |
| 12 | Image | Plano | | — | | | | |

Reference wavelength is 587.6 nm (d-line)
Effective radius of Surface 1 is 4.010 mm

TABLE 10

Aspheric Coefficients

| Surface # | 5 | 6 |
|---|---|---|
| k = | 0.0000E+00 | 0.0000E+00 |
| A4 = | −9.3986E−04 | −3.1678E−04 |
| A6 = | −2.5248E−04 | −2.1229E−04 |
| A8 = | 9.7614E−05 | 7.8652E−05 |
| A10 = | −1.7943E−05 | −1.3553E−05 |
| A12 = | 1.9005E−06 | 1.3451E−06 |
| A14 = | −1.0519E−07 | −6.9883E−08 |
| A16 = | 2.3665E−09 | 1.4798E−09 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

5th Embodiment

| | | | |
|---|---|---|---|
| f [mm] | 28.19 | TD/ImgH | 2.10 |
| Fno | 3.52 | |(R5 + R6)/(R5 − R6)| | 20.43 |
| HFOV [deg.] | 5.1 | |f/f1| + |f/f2| + |f/f3| | 4.14 |
| N1 + N2 | 3.681 | f/f1 | 2.14 |
| (N1 + N2)/N3 | 2.38 | f/f2 | −1.65 |
| N3 | 1.545 | f/f3 | 0.35 |
| V2 | 23.8 | f/ImgH | 11.27 |
| Vmin | 23.8 | f/R5 | −4.27 |
| ΣCTP/TD | 2.48 | f/R5 + f/R6 | −8.98 |
| ATmax/CTmin | 2.72 | f/R6 | −4.71 |
| BL/TD | 5.48 | f/TD | 5.37 |
| (CT1 + CT2)/T12 | 26.00 | f12/f3 | 0.47 |
| (CT1 + CT3)/CT2 | 3.65 | |f3/f1| + |f3/f2| | 10.68 |
| (T12 + T23)/(CT1 + CT2 + CT3) | 0.61 | ImgH/Y11 | 0.62 |
| T23/T12 | 20.44 | ImgH/Y32 | 0.73 |
| TD/EPD | 0.66 | Y11/Y32 | 1.16 |

6th Embodiment

Figure 11:
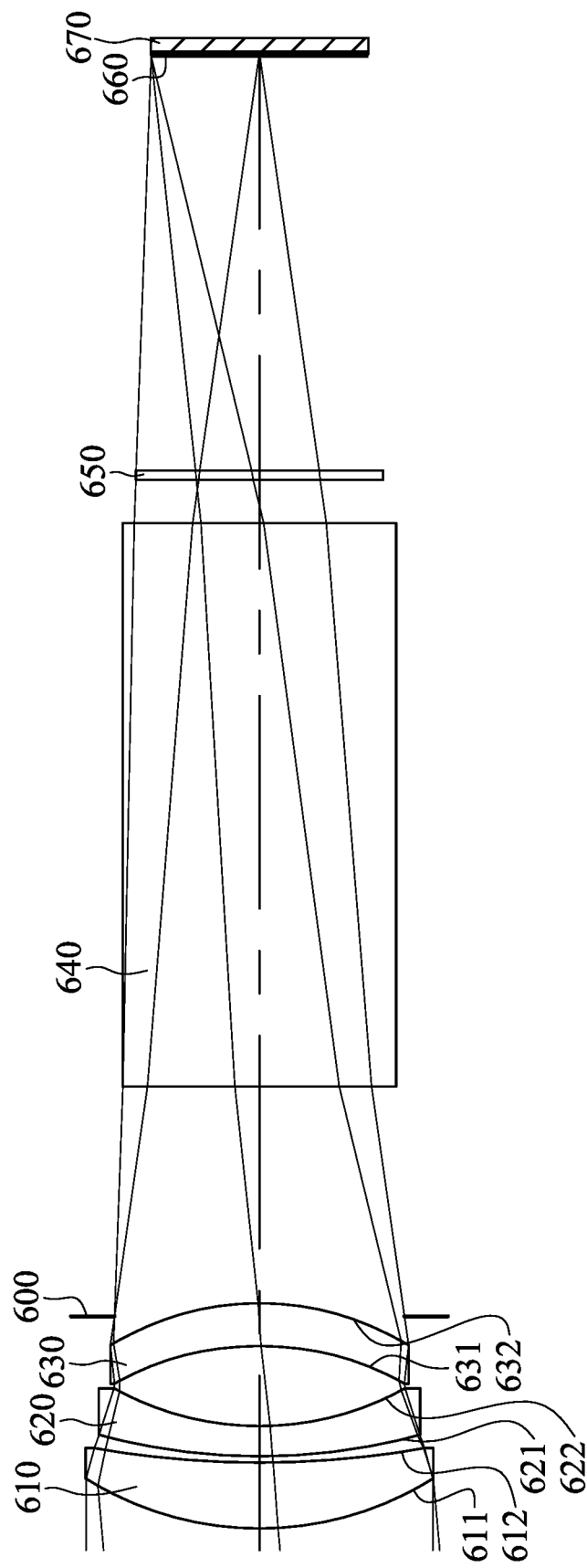
FIG. 11 is a schematic view of an imaging apparatus according to the 6th embodiment of the present disclosure.
Figure 12:
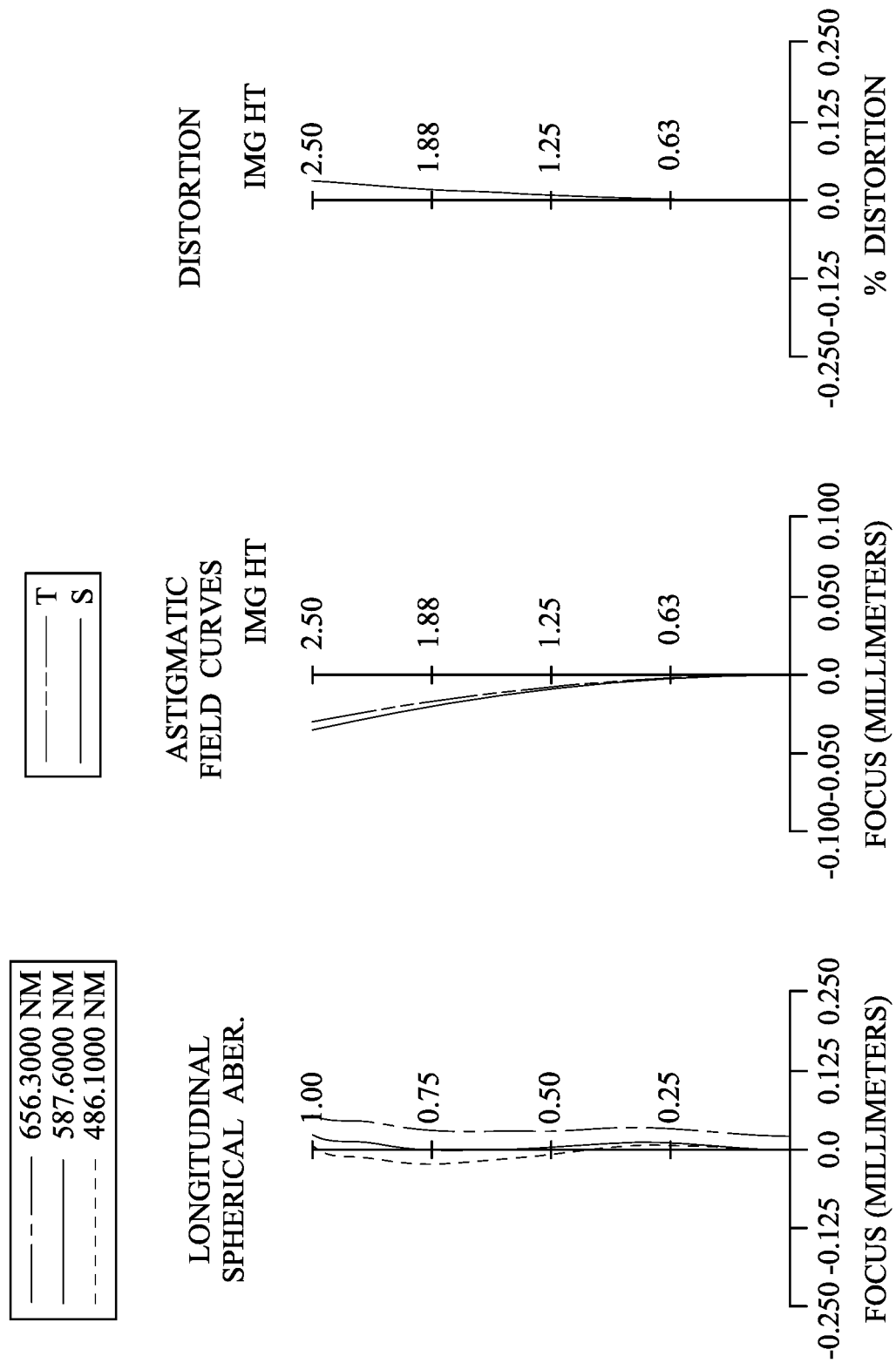
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows, in order from left to right, spherical aberration curves, astigmatic field curves and a distortion curve of the imaging apparatus of the 6th embodiment. In FIG. 11, the imaging apparatus according to the 6th embodiment includes an image capturing optical lens assembly (its reference number is omitted) and an image sensor 670. The image capturing optical lens assembly includes, in order from an object side to an image side along an optical path, a first lens element 610, a second lens element 620, a third lens element 630, an aperture stop 600, a prism 640, a filter 650 and an image surface 660, wherein the image sensor 670 is disposed on the image surface 660 of the image capturing optical lens assembly. The image capturing optical lens assembly includes three lens elements (610, 620, 630) without additional one or more lens elements inserted between the first lens element 610 and the third lens element 630.

The first lens element 610 with positive refractive power has an object-side surface 611 being convex in a paraxial region thereof and an image-side surface 612 being concave in a paraxial region thereof. The first lens element 610 is made of glass material.

The second lens element 620 with negative refractive power has an object-side surface 621 being convex in a paraxial region thereof and an image-side surface 622 being concave in a paraxial region thereof. The second lens element 620 is made of glass material.

The third lens element 630 with positive refractive power has an object-side surface 631 being concave in a paraxial region thereof and an image-side surface 632 being convex in a paraxial region thereof. The third lens element 630 is made of plastic material, and has the object-side surface 631 and the image-side surface 632 being both aspheric.

The prism 640 is made of glass material and disposed at an image side of the third lens element 630. The prism 640 can be taken as the image-side reflective member of the image capturing optical lens assembly.

The filter 650 is made of glass material and disposed between the prism 640 and the image surface 660 and will not affect a focal length of the image capturing optical lens assembly.

The detailed optical data of the 6th embodiment are shown in Table 11 and the aspheric surface data are shown in Table 12 below.

TABLE 11

6th Embodiment
f = 28.19 mm, Fno = 3.52, HFOV = 5.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.528 | | 1.524 | Glass | 1.835 | 42.7 | 13.14 |
| 2 | | 21.795 | | 0.140 | | | | |
| 3 | Lens 2 | 14.043 | | 0.700 | Glass | 1.847 | 23.8 | −16.79 |
| 4 | | 6.903 | | 1.846 | | | | |
| 5 | Lens 3 | −7.734 | ASP | 0.990 | Plastic | 1.545 | 56.1 | 75.41 |
| 6 | | −6.803 | ASP | −0.300 | | | | |
| 7 | Ape. Stop | Plano | | 5.300 | | | | |
| 8 | Prism | Plano | | 13.007 | Glass | 1.772 | 49.6 | — |
| 9 | | Plano | | 1.000 | | | | |
| 10 | Filter | Plano | | 0.210 | Glass | 1.517 | 64.2 | — |
| 11 | | Plano | | 9.612 | | | | |
| 12 | Image | Plano | | — | | | | |

Reference wavelength is 587.6 nm (d-line)
Effective radius of Surface 1 is 4.010 mm

TABLE 12

Aspheric Coefficients

| Surface # | 5 | 6 |
|---|---|---|
| k = | 0.0000E+00 | 0.0000E+00 |
| A4 = | −1.0910E−03 | −4.7990E−04 |
| A6 = | −1.4629E−04 | −1.3408E−04 |
| A8 = | 5.7949E−05 | 5.1256E−05 |
| A10 = | −1.0511E−05 | −8.8028E−06 |
| A12 = | 1.1090E−06 | 8.7361E−07 |
| A14 = | −6.1101E−08 | −4.5351E−08 |
| A16 = | 1.3694E−09 | 9.5994E−10 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 28.19 | TD/ImgH | 2.08 |
| Fno | 3.52 | |(R5 + R6)/(R5 − R6)| | 15.61 |
| HFOV [deg.] | 5.1 | |f/f1| + |f/f2| + |f/f3| | 4.20 |
| N1 + N2 | 3.681 | f/f1 | 2.15 |
| (N1 + N2)/N3 | 2.38 | f/f2 | −1.68 |
| N3 | 1.545 | f/f3 | 0.37 |
| V2 | 23.8 | f/ImgH | 11.27 |
| Vmin | 23.8 | f/R5 | −3.65 |
| ΣCTP/TD | 2.50 | f/R5 + f/R6 | −7.79 |
| ATmax/CTmin | 2.64 | f/R6 | −4.14 |
| BL/TD | 5.54 | f/TD | 5.42 |
| (CT1 + CT2)/T12 | 15.89 | f12/f3 | 0.51 |
| (CT1 + CT3)/CT2 | 3.59 | |f3/f1| + |f3/f2| | 10.23 |
| (T12 + T23)/(CT1 + CT2 + CT3) | 0.62 | ImgH/Y11 | 0.62 |

-continued

| 6th Embodiment | | | |
|---|---|---|---|
| T23/T12 | 13.19 | ImgH/Y32 | 0.73 |
| TD/EPD | 0.65 | Y11/Y32 | 1.17 |

7th Embodiment

Figure 13:
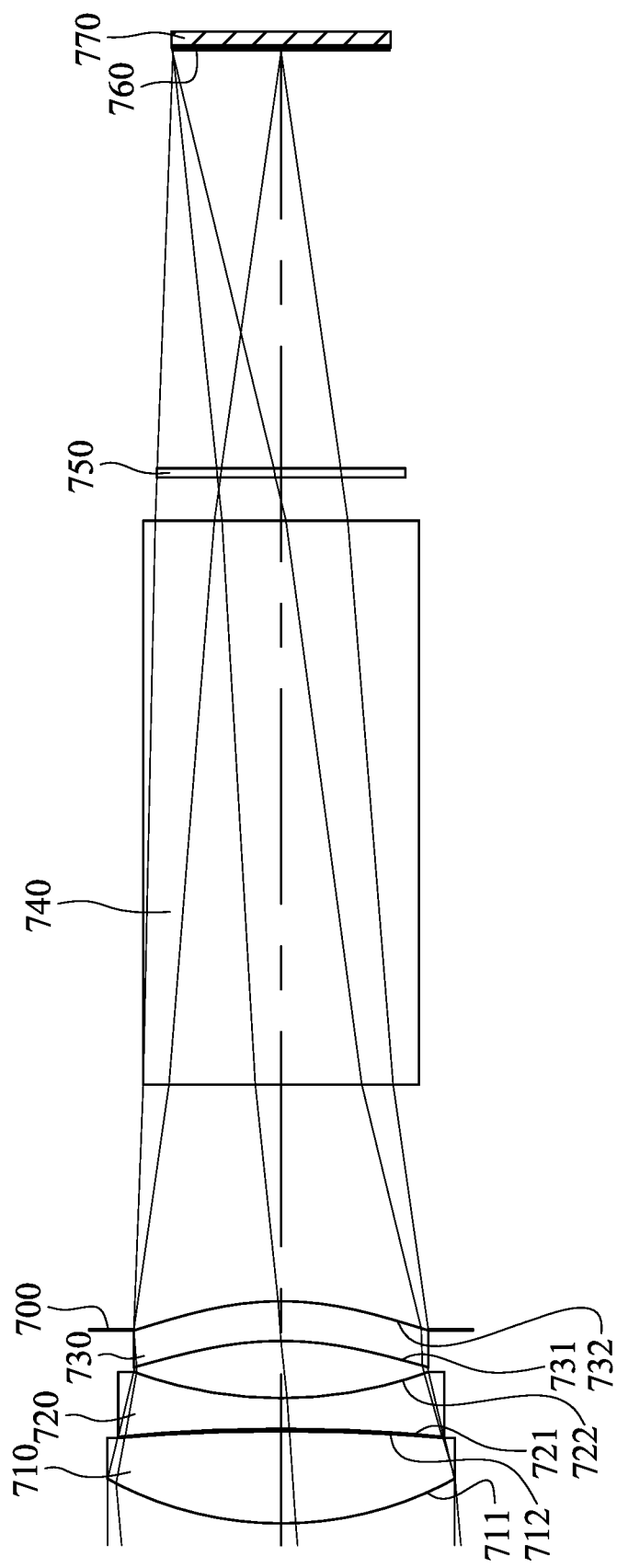
FIG. 13 is a schematic view of an imaging apparatus according to the 7th embodiment of the present disclosure.
Figure 14:
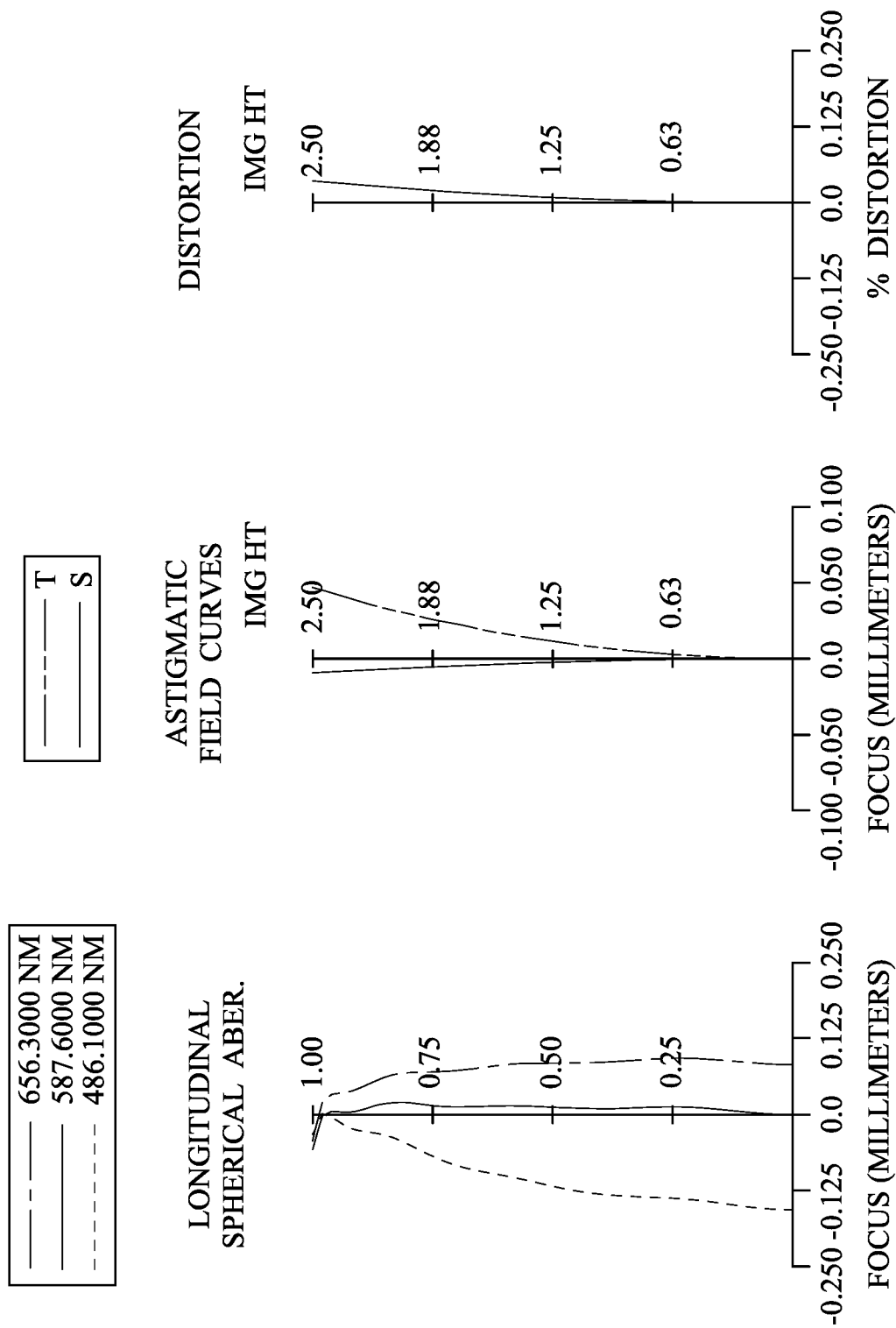
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows, in order from left to right, spherical aberration curves, astigmatic field curves and a distortion curve of the imaging apparatus of the 7th embodiment. In FIG. 13, the imaging apparatus according to the 7th embodiment includes an image capturing optical lens assembly (its reference number is omitted) and an image sensor 770. The image capturing optical lens assembly includes, in order from an object side to an image side along an optical path, a first lens element 710, a second lens element 720, a third lens element 730, an aperture stop 700, a prism 740, a filter 750 and an image surface 760, wherein the image sensor 770 is disposed on the image surface 760 of the image capturing optical lens assembly. The image capturing optical lens assembly includes three lens elements (710, 720, 730) without additional one or more lens elements inserted between the first lens element 710 and the third lens element 730.

The first lens element 710 with positive refractive power has an object-side surface 711 being convex in a paraxial region thereof and an image-side surface 712 being convex in a paraxial region thereof. The first lens element 710 is made of glass material.

The second lens element 720 with negative refractive power has an object-side surface 721 being concave in a paraxial region thereof and an image-side surface 722 being concave in a paraxial region thereof. The second lens element 720 is made of glass material.

The third lens element 730 with positive refractive power has an object-side surface 731 being concave in a paraxial region thereof and an image-side surface 732 being convex in a paraxial region thereof. The third lens element 730 is made of plastic material, and has the object-side surface 731 and the image-side surface 732 being both aspheric.

The prism 740 is made of glass material and disposed at an image side of the third lens element 730. The prism 740 can be taken as the image-side reflective member of the image capturing optical lens assembly.

The filter 750 is made of glass material and disposed between the prism 740 and the image surface 760 and will not affect a focal length of the image capturing optical lens assembly.

The detailed optical data of the 7th embodiment are shown in Table 13 and the aspheric surface data are shown in Table 14 below.

TABLE 13

7th Embodiment
f = 28.24 mm, Fno = 3.53, HFOV = 5.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 8.290 | 2.131 | Glass | 1.850 | 32.3 | 8.38 |
| 2 | | −44.642 | 0.058 | | | | |
| 3 | Lens 2 | −37.375 | 0.700 | Glass | 1.847 | 23.8 | −9.09 |
| 4 | | 9.781 | 1.321 | | | | |
| 5 | Lens 3 | −8.165 ASP | 0.917 | Plastic | 1.587 | 28.3 | 83.48 |
| 6 | | −7.290 ASP | −0.660 | | | | |
| 7 | Ape. Stop | Plano | 5.660 | | | | |
| 8 | Prism | Plano | 13.007 | Glass | 1.772 | 49.6 | — |
| 9 | | Plano | 1.000 | | | | |
| 10 | Filter | Plano | 0.210 | Glass | 1.517 | 64.2 | — |
| 11 | | Plano | 9.699 | | | | |
| 12 | Image | Plano | — | | | | |

Reference wavelength is 587.6 nm (d-line)
Effective radius of Surface 1 is 4.010 mm

TABLE 14

Aspheric Coefficients

| Surface # | 5 | 6 |
|---|---|---|
| k = | 0.0000E+00 | 0.0000E+00 |
| A4 = | 7.0740E−04 | 1.0163E−03 |
| A6 = | −2.0485E−04 | −2.1348E−04 |
| A8 = | 9.6562E−05 | 9.5609E−05 |
| A10 = | −1.9283E−05 | −1.8725E−05 |
| A12 = | 2.1112E−06 | 2.0179E−06 |
| A14 = | −1.1916E−07 | −1.1211E−07 |
| A16 = | 2.7052E−09 | 2.5069E−09 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 28.24 | TD/ImgH | 2.05 |
| Fno | 3.53 | \|(R5 + R6)/(R5 − R6)\| | 17.66 |
| HFOV [deg.] | 5.1 | \|f/f1\| + \|f/f2\| + \|f/f3\| | 6.81 |
| N1 + N2 | 3.697 | f/f1 | 3.37 |
| (N1 + N2)/N3 | 2.33 | f/f2 | −3.11 |
| N3 | 1.587 | f/f3 | 0.34 |
| V2 | 23.8 | f/ImgH | 11.28 |

-continued

| 7th Embodiment | | | |
|---|---|---|---|
| Vmin | 23.8 | f/R5 | −3.46 |
| ΣCTP/TD | 2.54 | f/R5 + f/R6 | −7.33 |
| ATmax/CTmin | 1.89 | f/R6 | −3.87 |
| BL/TD | 5.64 | f/TD | 5.51 |
| (CT1 + CT2)/T12 | 48.81 | f12/f3 | 0.44 |
| (CT1 + CT3)/CT2 | 4.35 | \|f3/f1\| + \|f3/f2\| | 19.14 |
| (T12 + T23)/(CT1 + CT2 + CT3) | 0.37 | ImgH/Y11 | 0.62 |
| T23/T12 | 22.78 | ImgH/Y32 | 0.74 |
| TD/EPD | 0.64 | Y11/Y32 | 1.18 |

8th Embodiment

Figure 15:
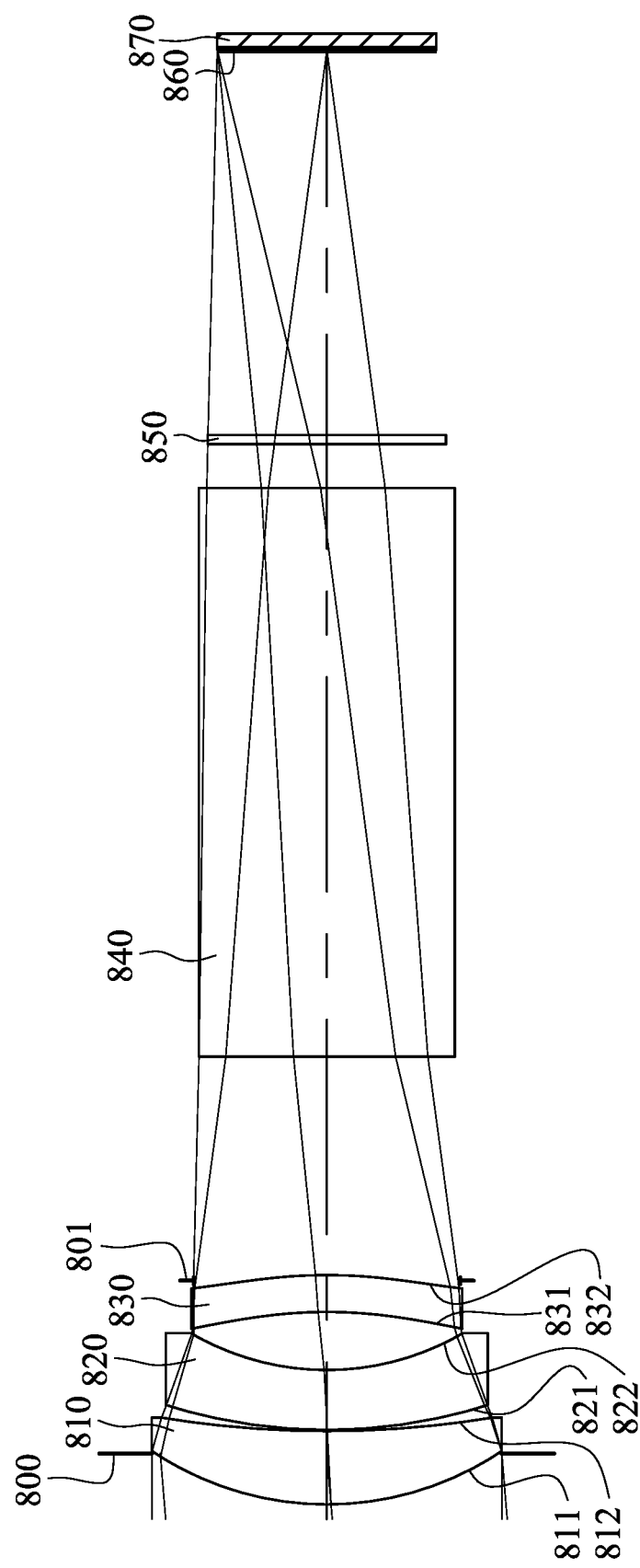
FIG. 15 is a schematic view of an imaging apparatus according to the 8th embodiment of the present disclosure.
Figure 16:
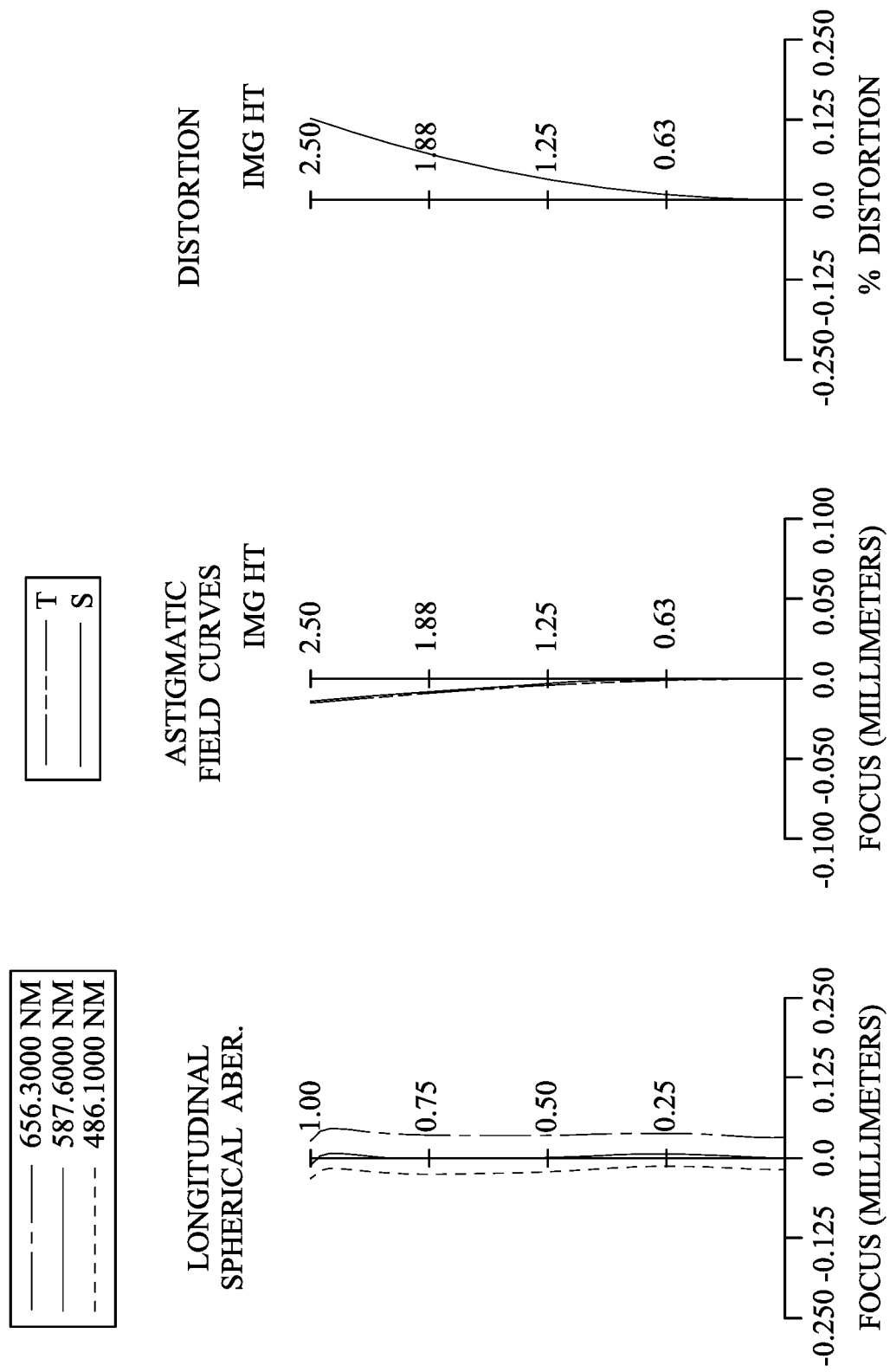
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows, in order from left to right, spherical aberration curves, astigmatic field curves and a distortion curve of the imaging apparatus of the 8th embodiment. In FIG. 15, the imaging apparatus according to the 8th embodiment includes an image capturing optical lens assembly (its reference number is omitted) and an image sensor 870. The image capturing optical lens assembly includes, in order from an object side to an image side along an optical path, an aperture stop 800, a first lens element 810, a second lens element 820, a third lens element 830, a stop 801, a prism 840, a filter 850 and an image surface 860, wherein the image sensor 870 is disposed on the image surface 860 of the image capturing optical lens assembly. The image capturing optical lens assembly includes three lens elements (810, 820, 830) without additional one or more lens elements inserted between the first lens element 810 and the third lens element 830.

The first lens element 810 with positive refractive power has an object-side surface 811 being convex in a paraxial region thereof and an image-side surface 812 being concave in a paraxial region thereof. The first lens element 810 is made of glass material.

The second lens element 820 with negative refractive power has an object-side surface 821 being convex in a paraxial region thereof and an image-side surface 822 being concave in a paraxial region thereof. The second lens element 820 is made of glass material.

The third lens element 830 with negative refractive power has an object-side surface 831 being concave in a paraxial region thereof and an image-side surface 832 being convex in a paraxial region thereof. The third lens element 830 is made of plastic material, and has the object-side surface 831 and the image-side surface 832 being both aspheric.

The prism 840 is made of glass material and disposed at an image side of the third lens element 830. The prism 840 can be taken as the image-side reflective member of the image capturing optical lens assembly.

The filter 850 is made of glass material and disposed between the prism 840 and the image surface 860 and will not affect a focal length of the image capturing optical lens assembly.

The detailed optical data of the 8th embodiment are shown in Table 15 and the aspheric surface data are shown in Table 16 below.

TABLE 15

8th Embodiment
f = 30.12 mm, Fno = 3.76, HFOV = 4.7 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.171 | | | | |
| 2 | Lens 1 | 7.163 | | 1.683 | Glass | 1.804 | 46.6 | 12.28 |
| 3 | | 23.358 | | 0.021 | | | | |
| 4 | Lens 2 | 12.137 | | 1.371 | Glass | 1.847 | 23.8 | −16.47 |
| 5 | | 6.152 | | 1.330 | | | | |
| 6 | Lens 3 | −11.455 | ASP | 0.844 | Plastic | 1.566 | 37.4 | −529.69 |
| 7 | | −12.227 | ASP | −0.127 | | | | |
| 8 | Stop | Plano | | 5.127 | | | | |
| 9 | Prism | Plano | | 13.007 | Glass | 1.772 | 49.6 | — |
| 10 | | Plano | | 1.000 | | | | |
| 11 | Filter | Plano | | 0.210 | Glass | 1.517 | 64.2 | — |
| 12 | | Plano | | 8.815 | | | | |
| 13 | Image | Plano | | — | | | | |

Reference wavelength is 587.6 nm (d-line)
Effective radius of Surface 8 (Stop 801) is 3.050 mm

TABLE 16

| Aspheric Coefficients | | |
|---|---|---|
| Surface # | 6 | 7 |
| k = | 0.0000E+00 | 0.0000E+00 |
| A4 = | −2.7083E−04 | 2.3203E−04 |
| A6 = | 4.0677E−05 | 2.0983E−05 |
| A8 = | 1.9472E−05 | 2.8254E−05 |
| A10 = | −4.5093E−06 | −6.4932E−06 |
| A12 = | 5.9027E−07 | 8.5366E−07 |
| A14 = | −4.1159E−08 | −5.9049E−08 |
| A16 = | 1.1660E−09 | 1.6634E−09 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 30.12 | TD/ImgH | 2.10 |
| Fno | 3.76 | |(R5 + R6)/(R5 − R6)| | 30.67 |
| HFOV [deg.] | 4.7 | |f/f1| + |f/f2| + |f/f3| | 4.34 |
| N1 + N2 | 3.651 | f/f1 | 2.45 |
| (N1 + N2)/N3 | 2.33 | f/f2 | −1.83 |
| N3 | 1.566 | f/f3 | −0.06 |
| V2 | 23.8 | f/ImgH | 12.03 |
| Vmin | 23.8 | f/R5 | −2.63 |
| ΣCTP/TD | 2.48 | f/R5 + f/R6 | −5.09 |
| ATmax/CTmin | 1.58 | f/R6 | −2.46 |
| BL/TD | 5.34 | f/TD | 5.74 |
| (CT1 + CT2)/T12 | 145.43 | f12/f3 | −0.05 |
| (CT1 + CT3)/CT2 | 1.84 | |f3/f1| + |f3/f2| | 75.30 |
| (T12 + T23)/(CT1 + CT2 + CT3) | 0.35 | ImgH/Y11 | 0.63 |
| T23/T12 | 63.33 | ImgH/Y32 | 0.82 |
| TD/EPD | 0.66 | Y11/Y32 | 1.30 |

9th Embodiment

Figure 25A:
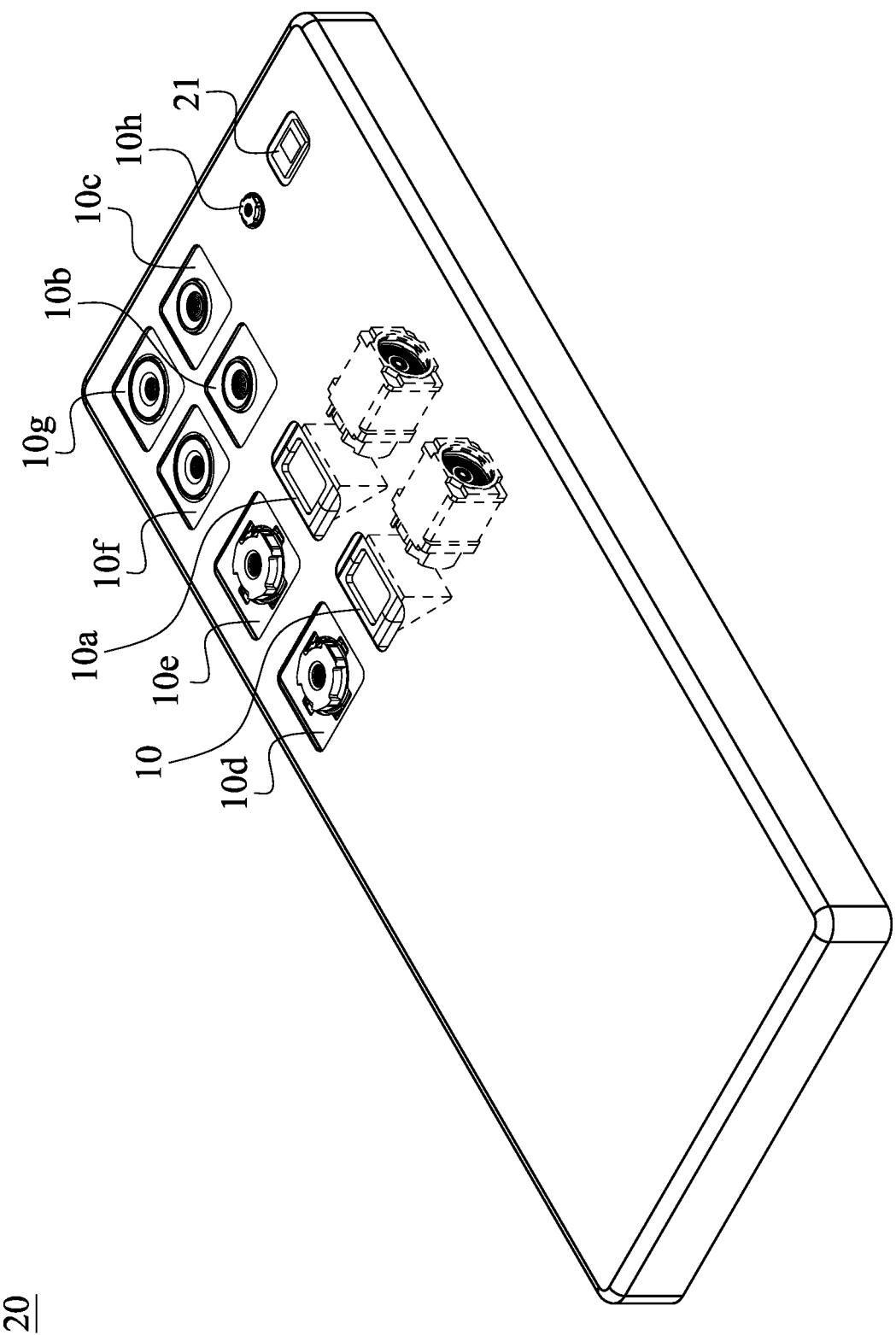
FIG. 25A is a schematic view of one side of an electronic device according to the 9th embodiment of the present disclosure.
Figure 25B:
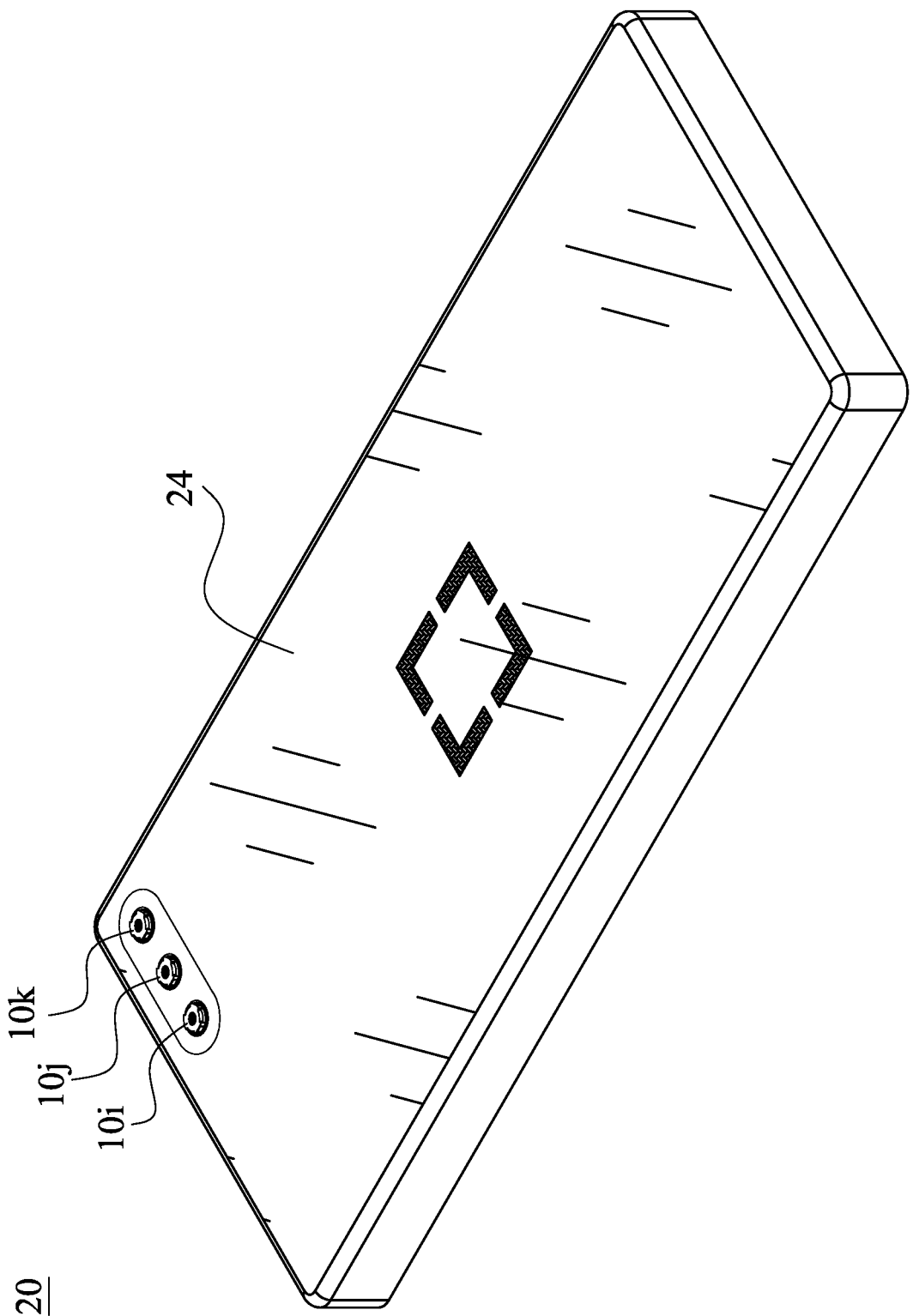
FIG. 25B is a schematic view of another side of the electronic device of FIG. 25A.
Figure 25C:
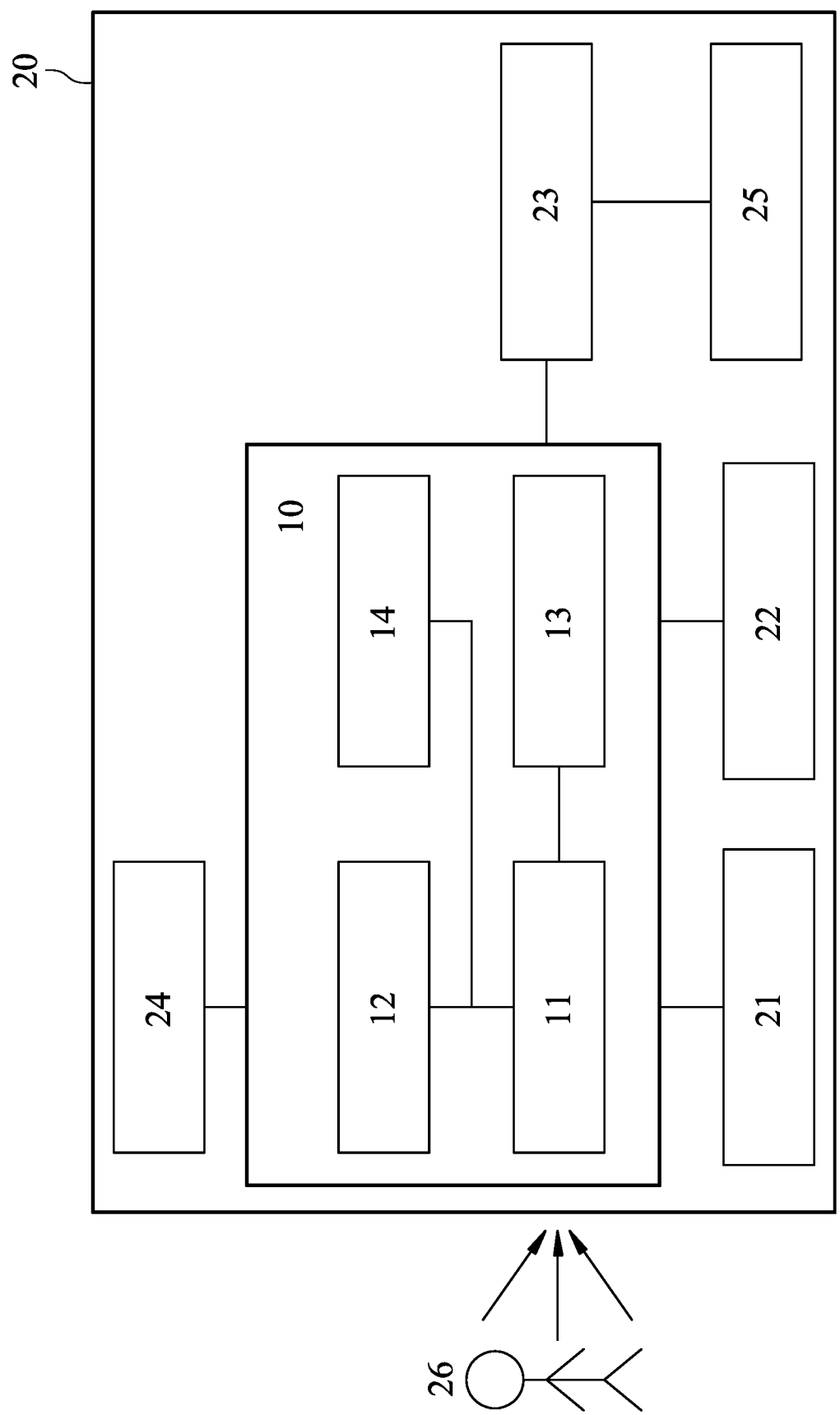
FIG. 25C is a system schematic view of the electronic device of FIG. 25A.

FIG. 25A is a schematic view of one side of an electronic device 20 according to the 9th embodiment of the present disclosure. FIG. 25B is a schematic view of another side of the electronic device 20 of FIG. 25A. FIG. 25C is a system schematic view of the electronic device 20 of FIG. 25A. In FIG. 25A, FIG. 25B and FIG. 25C, the electronic device 20 according to the 9th embodiment is a smartphone, wherein the electronic device 20 includes imaging apparatuses 10, 10a, 10b, 10c, 10d, 10e, 10f, 10g, 10h, 10i, 10j, 10k, a flash module 21, a focusing assisting module 22, an image signal processor (ISP) 23, a user interface 24 and an image software processor 25. The imaging apparatuses 10i, 10j, 10k are front cameras.

The imaging apparatus 10 is a camera module, the imaging apparatus 10 includes an imaging lens assembly 11, a driving apparatus 12 and an image sensor 13, wherein the imaging lens assembly 11 includes the image capturing optical lens assembly of the present disclosure and a lens barrel (its reference number is omitted) for carrying the image capturing optical lens assembly. The imaging apparatus 10 can focus light from an imaged object 26 via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys. The image capturing optical lens assembly can obtain a favorable imaging position by the driving apparatus 12 so as to capture clear images when the imaged object 26 is disposed at different object distances.

The imaging apparatus 10 can include the image sensor 13 located on the image surface of the image capturing optical lens assembly, such as CMOS and CCD, with superior photosensitivity and low noise. Thus, it is favorable for providing realistic images with high definition image quality thereof.

Furthermore, the imaging apparatus 10 can further include an image stabilization module 14, which can be a kinetic energy sensor, such as an accelerometer, a gyro sensor, and a Hall Effect sensor. In the 9th embodiment, the image stabilization module 14 of the imaging apparatus 10 is a gyro sensor, but is not limited thereto. Therefore, the variation of different axial directions of the image capturing optical lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS), can be provided.

When a user captures images of the imaged object 26 through the user interface 24, the light rays converge in at least one of the imaging apparatuses 10, 10a, 10b, 10c, 10d, 10e, 10f, 10g, 10h, 10i, 10j, 10k to generate an image(s), and the flash module 21 is activated for light supplement. The focusing assisting module 22 detects the object distance of the imaged object 26 to achieve fast auto focusing. The image signal processor 23 and the image software processor 25 are configured to optimize the captured image to improve image quality. The light beam emitted from the focusing assisting module 22 can be either conventional infrared or laser. The user interface 24 can be a touch screen or a physical button. The user is able to interact with the user interface 24 and an image processing software having multiple functions to capture images and complete image processing.

The imaging apparatuses 10a, 10b, 10c, 10d, 10e, 10f, 10g, 10h, 10i, 10j, 10k of the 9th embodiment can include the image capturing optical lens assembly of the present disclosure, and can be the same as or similar to the imaging apparatus 10 and will not be described again herein. In detail, each of the imaging apparatuses 10, 10a of the 9th embodiment can be a telephoto imaging apparatus (which can include at least one light path folding element, such as at least one object-side reflective member or at least one image-side reflective member), each of the imaging apparatuses 10b, 10c can be a telephoto imaging apparatus, each of the imaging apparatuses 10d, 10e can be a wide-angle imaging apparatus, each of the imaging apparatuses 10f, 10g can be a super wide-angle imaging apparatus, the imaging apparatuses 10h can be a time-of-flight (TOF) module, the imaging apparatuses 10i, 10j, 10k can respectively be a TOF module, a super wide-angle imaging apparatus and a wide-angle imaging apparatus, or other kinds of imaging apparatus, and the present disclosure is not limited thereto. Moreover, the connection between the imaging apparatuses 10a, 10b, 10c, 10d, 10e, 10f, 10g, 10h, 10i, 10j, 10k and other elements can be the same as the imaging apparatus 10 in FIG. 25C, or can be modified according to the types of the imaging apparatuses, which will not be described again herein.

10th Embodiment

Figure 26:
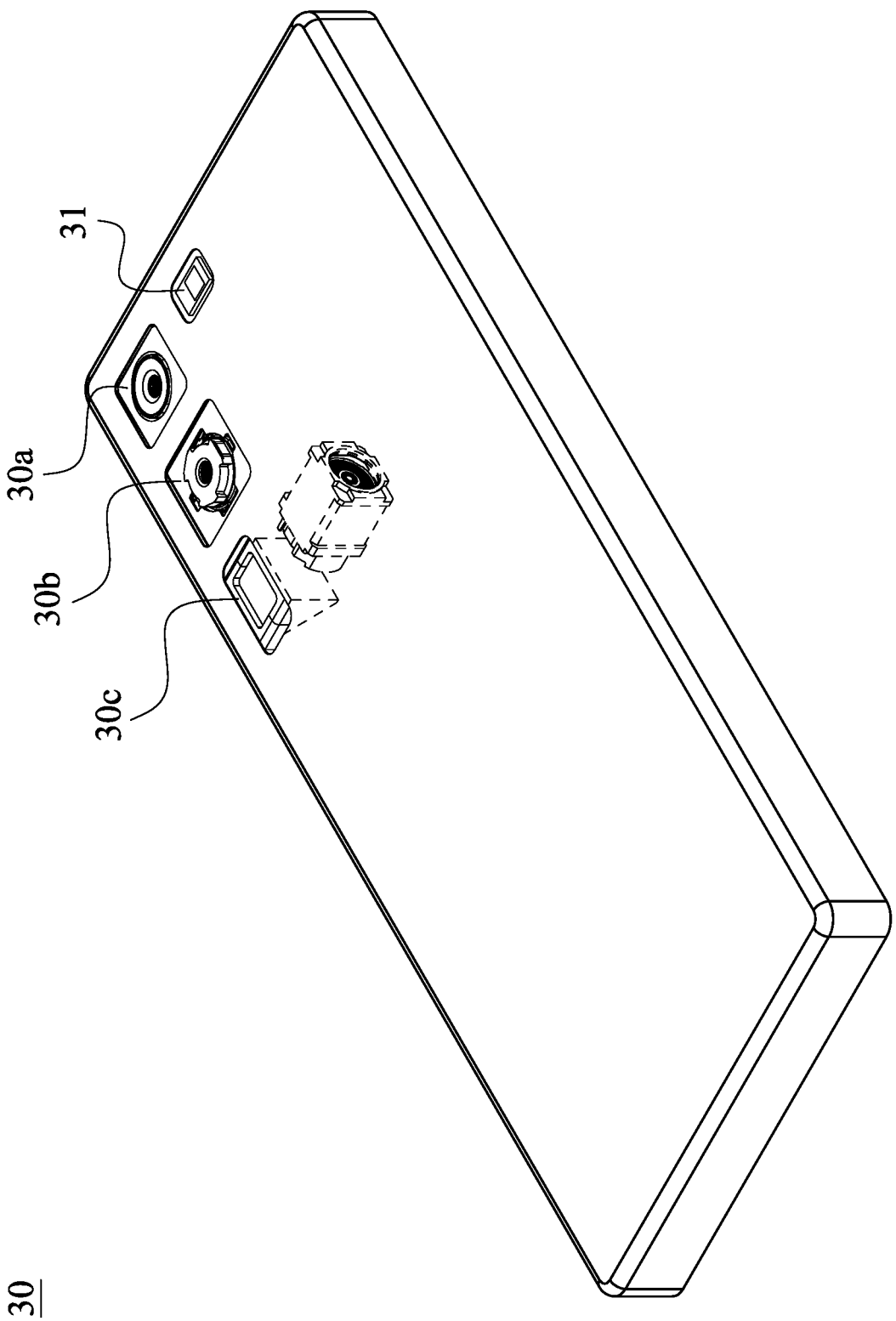
FIG. 26 is a schematic view of one side of an electronic device according to the 10th embodiment of the present disclosure.

FIG. 26 is a schematic view of one side of an electronic device 30 according to the 10th embodiment of the present disclosure. The electronic device 30 according to the 10th embodiment is a smartphone, wherein the electronic device 30 includes three imaging apparatuses 30a, 30b, 30c, and a flash module 31.

The electronic device 30 of the 10th embodiment can include elements which is the same as or similar to the elements of the aforementioned 9th embodiment. The connection among the imaging apparatuses 30a, 30b, 30c, the flash module 31 and other elements is the same as or similar to the 9th embodiment and will not be described again herein. All of the imaging apparatuses 30a, 30b, 30c of the 10th embodiment can include the image capturing optical lens assembly of the present disclosure, and can be the same as or similar to the imaging apparatus 10 according to the 9th embodiment and will not be described again herein. In detail, the imaging apparatuses 30a, 30b, 30c can be respectively a super wide-angle imaging apparatus, a wide-angle imaging apparatus and a telephoto imaging apparatus (which can include at least one light path folding element, such as at least one object-side reflective member or at least one image-side reflective member), or other kinds of imaging apparatus, and the present disclosure is not limited thereto.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical lens assembly comprising three lens elements, the three lens elements being, in order from an object side to an image side along an optical path:
a first lens element, a second lens element and a third lens element, each of the three lens elements has an object-side surface towards the object side and an image-side surface towards the image side;
wherein the second lens element has negative refractive power; the object-side surface of the third lens element is concave in a paraxial region thereof, the image-side surface of the third lens element is convex in a paraxial region thereof; the image capturing optical lens assembly has a total of three lens elements;
wherein an axial distance between the first lens element and the second lens element is T12, an axial distance between the second lens element and the third lens element is T23, a central thickness of the first lens element is CT1, a central thickness of the second lens element is CT2, a central thickness of the third lens element is CT3, a focal length of the image capturing optical lens assembly is f, an axial distance between the object-side surface of the first lens element and the image-side surface of the third lens element is TD, a maximum image height of the image capturing optical lens assembly is imgH, and the following conditions are satisfied:

$0.10<(T12+T23)/(CT1+CT2+CT3)<1.6$;

$3.00<f/TD<100$; and $1.0<TD/ImgH<5.0$.

2. The image capturing optical lens assembly of claim 1, wherein the object-side surface of the first lens element is convex in a paraxial region thereof; the axial distance between the first lens element and the second lens element is T12, the axial distance between the second lens element and the third lens element is T23, the central thickness of the first lens element is CT1, the central thickness of the second lens element is CT2, the central thickness of the third lens element is CT3, and the following condition is satisfied:

$0.10<(T12+T23)/(CT1+CT2+CT3)<1.1$.

3. The image capturing optical lens assembly of claim 1, wherein the image-side surface of the second lens element is concave in a paraxial region thereof; the focal length of the image capturing optical lens assembly is f, the axial distance between the object-side surface of the first lens element and the image-side surface of the third lens element is TD, a maximum among all axial distances between adjacent lens elements of the image capturing optical lens assembly is ATmax, a minimum among central thicknesses of all lens elements of the image capturing optical lens assembly is CTmin, and the following conditions are satisfied:

$3.30<f/TD<8.00$; and $0.60<AT\max/CT\min<7.0$.

4. The image capturing optical lens assembly of claim 1, wherein the axial distance between the object-side surface of the first lens element and the image-side surface of the third lens element is TD, the maximum image height of the image capturing optical lens assembly is ImgH, a refractive index of the third lens element is N3, the central thickness of the first lens element is CT1, the central thickness of the second lens element is CT2, the central thickness of the third lens element is CT3, and the following conditions are satisfied:

$1.3<TD/ImgH<4.0$;

$1.40<N3<1.60$; and $1.4<(CT1+CT3)/CT2<8.1$.

5. The image capturing optical lens assembly of claim 1, wherein a refractive index of the first lens element is N1, a refractive index of the second lens element is N2, a curvature radius of the object-side surface of the third lens element is R5, a curvature radius of the image-side surface of the third lens element is R6, and the following conditions are satisfied:

$3.50<N1+N2<4.00$; and $4.0<|(R5+R6)/(R5-R6)|$.

6. The image capturing optical lens assembly of claim 1, wherein the focal length of the image capturing optical lens assembly is f, a focal length of the third lens element is f3, and the following condition is satisfied:

$-0.50<f/f3<1.0$.

7. The image capturing optical lens assembly of claim 1, wherein the maximum image height of the image capturing optical lens assembly is ImgH, a maximum distance between an optical effective area of the object-side surface of the first lens element and an optical axis is Y11, a maximum distance between an optical effective area of the image-side surface of the third lens element and the optical axis is Y32, and the following conditions are satisfied:

$0.45<ImgH/Y11<1.1$;

$0.50<ImgH/Y32<1.1$; and $0.90<Y11/Y32<1.5$.

8. The image capturing optical lens assembly of claim 1, wherein an optical effective area of at least one of the three lens elements comprises a non-circular shape, the non-circular shape has at least two arc sides and at least two straight sides, a radius of each of the at least two arc sides is Y, a vertical distance between each of the at least two straight sides and an optical axis is D, and the following condition is satisfied:

$1.1<Y/D<2.0$.

9. An image capturing optical lens assembly comprising three lens elements, the three lens elements being, in order from an object side to an image side along an optical path:
a first lens element, a second lens element and a third lens element, each of the three lens elements has an object-side surface towards the object side and an image-side surface towards the image side;
wherein the first lens element has positive refractive power; the image-side surface of the second lens element is concave in a paraxial region thereof; the object-side surface of the third lens element is concave in a paraxial region thereof, the image-side surface of the third lens element is convex in a paraxial region thereof; the image capturing optical lens assembly has a total of three lens elements;
wherein an axial distance between the first lens element and the second lens element is T12, an axial distance between the second lens element and the third lens element is T23, a central thickness of the first lens element is CT1, a central thickness of the second lens element is CT2, a central thickness of the third lens element is CT3, a focal length of the image capturing optical lens assembly is f, an axial distance between the object-side surface of the first lens element and the image-side surface of the third lens element is TD, a maximum image height of the image capturing optical lens assembly is ImgH, and the following conditions are satisfied:

$0<(T12+T23)/(CT1+CT2+CT3)<2.0;$ $3.00<f/TD<8.00;$ and $1.0<TD/ImgH<5.0.$

10. The image capturing optical lens assembly of claim 9, wherein the axial distance between the first lens element and the second lens element is T12, the axial distance between the second lens element and the third lens element is T23, the central thickness of the first lens element is CT1, the central thickness of the second lens element is CT2, the central thickness of the third lens element is CT3, the focal length of the image capturing optical lens assembly is f, the axial distance between the object-side surface of the first lens element and the image-side surface of the third lens element is TD, and the following conditions are satisfied:

$0.10<(T12+T23)/(CT1+CT2+CT3)<1.6;$ and $3.30<f/TD<6.90.$

11. The image capturing optical lens assembly of claim 9, wherein the axial distance between the first lens element and the second lens element is T12, the axial distance between the second lens element and the third lens element is T23, the central thickness of the first lens element is CT1, the central thickness of the second lens element is CT2, the central thickness of the third lens element is CT3, the axial distance between the object-side surface of the first lens element and the image-side surface of the third lens element is TD, the maximum image height of the image capturing optical lens assembly is ImgH, and the following conditions are satisfied:

$0.10<(T12+T23)/(CT1+CT2+CT3)<1.6;$ and $1.3<TD/ImgH<4.0.$

12. The image capturing optical lens assembly of claim 9, wherein at least two of the three lens elements are made of glass material, at least one of the three lens elements is made of plastic material and has the object-side surface and the image-side surface being both aspheric; an Abbe number of the second lens element is V2, and the following condition is satisfied:

$13.0<V2<27.0.$

13. The image capturing optical lens assembly of claim 9, wherein the axial distance between the first lens element and the second lens element is T12, the axial distance between the second lens element and the third lens element is T23, an f-number of the image capturing optical lens assembly is Fno, and the following conditions are satisfied:

$3.00<T23/T12<200;$ and $2.5<Fno<4.5.$

14. The image capturing optical lens assembly of claim 9, wherein the focal length of the image capturing optical lens assembly is f, a focal length of the first lens element is f1, a focal length of the second lens element is f2, a focal length of the third lens element is f3, a half of a maximum field of view of the image capturing optical lens assembly is HFOV, and the following conditions are satisfied:

$3.0<|f/f1|+|f/f2|+|f/f3|<7.0;$ and $3.0 \text{ degrees} <HFOV<9.0 \text{ degrees}.$

15. The image capturing optical lens assembly of claim 9, wherein the focal length of the image capturing optical lens assembly is f, a curvature radius of the object-side surface of the third lens element is R5, a curvature radius of the image-side surface of the third lens element is R6, a focal length of the first lens element is f1, a focal length of the second lens element is f2, a focal length of the third lens element is f3, and the following conditions are satisfied:

$-10<f/R5<-3.4;$ $-10<f/R6<-3.4;$ and $4.0<|f3/f1|+|f3/f2|.$

16. The image capturing optical lens assembly of claim 9, wherein the second lens element has negative refractive power; the focal length of the image capturing optical lens assembly is f, a focal length of the second lens element is f2, an axial distance between the image-side surface of the third lens element and an image surface is BL, the axial distance between the object-side surface of the first lens element and the image-side surface of the third lens element is TD, and the following conditions are satisfied:

$-3.3<f/f2<-1.0;$ and $3.3<BL/TD<6.5.$

17. An image capturing optical lens assembly comprising three lens elements, the three lens elements being, in order from an object side to an image side along an optical path:
a first lens element, a second lens element and a third lens element, each of the three lens elements has an object-side surface towards the object side and an image-side surface towards the image side;
wherein the second lens element has negative refractive power; the object-side surface of the third lens element is concave in a paraxial region thereof; the image capturing optical lens assembly has a total of three lens elements;
wherein an axial distance between the first lens element and the second lens element is T12, an axial distance between the second lens element and the third lens element is T23, a central thickness of the first lens element is CT1, a central thickness of the second lens element is CT2, a central thickness of the third lens element is CT3, a focal length of the image capturing optical lens assembly is f, an axial distance between the object-side surface of the first lens element and the image-side surface of the third lens element is TD, a maximum image height of the image capturing optical lens assembly is ImgH, and the following conditions are satisfied:

$0.10<(T12+T23)/(CT1+CT2+CT3)<1.1;$ $3.00<f/TD<11.5;$ and $1.0<TD/ImgH<5.0.$

18. The image capturing optical lens assembly of claim 17, wherein the axial distance between the first lens element and the second lens element is T12, the axial distance between the second lens element and the third lens element is T23, the central thickness of the first lens element is CT1, the central thickness of the second lens element is CT2, the central thickness of the third lens element is CT3, the focal length of the image capturing optical lens assembly is f, the axial distance between the object-side surface of the first lens element and the image-side surface of the third lens element is TD, and the following conditions are satisfied:

$0.20<(T12+T23)/(CT1+CT2+CT3)<0.90;$ and $3.30<f/TD<8.00.$

19. The image capturing optical lens assembly of claim 17, wherein the image-side surface of the second lens element is concave in a paraxial region thereof; the axial distance between the object-side surface of the first lens element and the image-side surface of the third lens element is TD, the maximum image height of the image capturing optical lens assembly is ImgH, a minimum among Abbe numbers of all lens elements of the image capturing optical lens assembly is Vmin, and the following conditions are satisfied:

$1.3<TD/ImgH<4.0;$ and $14.0<V\min<27.0.$

20. The image capturing optical lens assembly of claim 17, wherein a refractive index of the first lens element is N1, a refractive index of the second lens element is N2, a refractive index of the third lens element is N3, the focal length of the image capturing optical lens assembly is f, a curvature radius of the object-side surface of the third lens element is R5, a curvature radius of the image-side surface of the third lens element is R6, and the following conditions are satisfied:

$2.25<(N1+N2)/N3<3.00;$ and $-25<f/R5+f/R6<-5.0.$

21. The image capturing optical lens assembly of claim 17, wherein the central thickness of the first lens element is CT1, the central thickness of the second lens element is CT2, the axial distance between the first lens element and the second lens element is T12, and the following condition is satisfied:

$6.00<(CT1+CT2)/T12<200.$

22. The image capturing optical lens assembly of claim 17, wherein the axial distance between the object-side surface of the first lens element and the image-side surface of the third lens element is TD, an entrance pupil diameter of the image capturing optical lens assembly is EPD, the focal length of the image capturing optical lens assembly is f, the maximum image height of the image capturing optical lens assembly is ImgH, and the following conditions are satisfied:

$0.50<TD/EPD<0.90;$ and $10.0<f/ImgH<15.0.$

23. The image capturing optical lens assembly of claim 17, wherein a composite focal length of the first lens element and the second lens element is f12, a focal length of the third lens element is f3, and the following condition is satisfied:

$-0.30<f12/f3<15.$

24. The image capturing optical lens assembly of claim 17, wherein the first lens element has positive refractive power, the object-side surface of the first lens element is convex in a paraxial region thereof; the image-side surface of the third lens element is convex in a paraxial region thereof; the focal length of the image capturing optical lens assembly is f, a focal length of the first lens element is f1, and the following condition is satisfied:

$1.00<f/f1\leq3.37.$

25. The image capturing optical lens assembly of claim 17, further comprising:
at least one object-side reflective member disposed at an object side of the first lens element; and
at least one image-side reflective member disposed at an image side of the third lens element, and comprising at least two reflective surfaces and at least one prism;
wherein a sum of central thickness of the at least one prism of the at least one image-side reflective member of the image capturing optical lens assembly is ΣCTP, the axial distance between the object-side surface of the first lens element and the image-side surface of the third lens element is TD, and the following condition is satisfied:

$1.0<\Sigma CTP/TD<3.5.$

26. An imaging apparatus, comprising:
the image capturing optical lens assembly of claim 17; and
an image sensor disposed on an image surface of the image capturing optical lens assembly.

27. An electronic device, comprising:
at least three imaging apparatuses located on the same side of the electronic device, wherein at least one of the at least three imaging apparatuses is the imaging apparatus of claim 26, and at least one of the at least three imaging apparatuses comprises at least one reflective member.

28. The electronic device of claim 27, wherein each of at least two of the at least three imaging apparatuses comprises at least one of the reflective member.

29. The electronic device of claim 27, wherein at least one of the at least three imaging apparatuses comprises at least two of the reflective member.

* * * * *